(12) United States Patent
Suzuki et al.

(10) Patent No.: US 7,601,784 B2
(45) Date of Patent: Oct. 13, 2009

(54) MOLECULAR COMPOUNDS CONTAINING POLYMERS HAVING HYDROGEN BOND SITES AS THE CONSTITUENT COMPOUNDS

(75) Inventors: Hiroshi Suzuki, Chiba (JP); Satoru Abe, Chiba (JP)

(73) Assignee: Nippon Soda Co., Ltd., Tokyo (JP)

(*) Notice: Subject to any disclaimer, the term of this patent is extended or adjusted under 35 U.S.C. 154(b) by 236 days.

(21) Appl. No.: 11/125,283

(22) Filed: May 9, 2005

(65) Prior Publication Data

US 2005/0228167 A1   Oct. 13, 2005

Related U.S. Application Data

(63) Continuation-in-part of application No. 10/149,617, filed as application No. PCT/JP00/08770 on Dec. 12, 2000, now abandoned.

(30) Foreign Application Priority Data

Dec. 13, 1999  (JP) ................................ 11-353738

(51) Int. Cl.
*C08G 65/322* (2006.01)
(52) U.S. Cl. .................... 525/403; 525/417; 568/720; 568/722; 568/723
(58) Field of Classification Search ................ 525/403, 525/417; 568/720, 722, 723
See application file for complete search history.

(56) References Cited

U.S. PATENT DOCUMENTS

| | | | |
|---|---|---|---|
| 3,836,590 A * | 9/1974 | Brindell ................... 552/115 |
| 4,270,953 A * | 6/1981 | Nakagawa et al. ............ 106/16 |
| 4,426,464 A * | 1/1984 | Sghibartz ................... 523/122 |
| 5,716,667 A * | 2/1998 | Kashiwada et al. ......... 427/156 |
| 5,965,663 A * | 10/1999 | Hayase ..................... 524/609 |
| 6,147,169 A * | 11/2000 | Ohnishi ..................... 525/523 |
| 2002/0193528 A1 * | 12/2002 | Suzuki et al. .............. 525/259 |

FOREIGN PATENT DOCUMENTS

| | | | |
|---|---|---|---|
| EP | 0397395 | | 11/1990 |
| EP | 397395 A | * | 11/1990 |
| EP | 620256 A2 | * | 10/1994 |
| JP | 02038413 A | * | 2/1990 |
| JP | 02038413 | | 7/1990 |
| JP | 7-331002 | | 12/1995 |
| JP | 08012907 | | 1/1996 |
| JP | 08012907 A | * | 1/1996 |
| JP | 11-209524 | | 8/1999 |
| JP | 2000-273319 | | 10/2000 |
| JP | 2000273319 A | * | 10/2000 |

OTHER PUBLICATIONS

English translation of JP 08012907A.*
Ohno et al., "Fluorescence Study of the Formation of Polymer Complexes through Hydrogen Bond," Makromol. Chem., Rapid Commun. (Japan), p. 591-594, (1980).
Osada et al., "Mechanochemical Energy Conversion in a Polymer Membrane by Thermo-Reversible Polymer-Polymer Interactions," Die Makromolekulare Chemie, No. 176, p. 2761-2764, (1975).
M. Dosiere, "Lamellar Structure of Poly(Ethylene oxide) molecular Complexes," Macromol. Symp., No. 114, p. 51-62, (1997).
James H. Clark et al., "Supramolecular assembly in a polymer/low-molar-mass system," Supramolecular Science, vol. 2 (No. 1), p. 41-43, (1995).
Chatani et al., "Structural Studies of Poly(ethylenimine). 1. Structures of Two Hydrates of Poly(ethylenimine): Sesquihydrate and Dihydrate," Macromolecules, American Chemical Society, p. 315-321, 8 (1981).
J. J. Point et al., "Neutron diffraction study of poly(ethylene oxide)-p-dihalogenobenzene crystalline complexes," Polymer Communications, vol. 32 (No. 15), p. 477-480, (1991).
Y. Chatani et al., "Structural study on syndiotactic polystyrene: 4. Formation and crystal structure of molecular compound with iodine," Polymer, vol. 34 (No. 23), p. 4841-4845, (1993).
K. Monobe et al., "Molecular Association Complex of Urea with Polyethrylene. Morphology of Urea-Polyethylene Complex and polyethylene Crystals Obtained from the Complex," J. Macromol. Sci.-Phys., p. 277-293, (1973).

H. Tadokoro et al., "A Preliminary Report of Structural Studies on Polyethylene Oxide-Urea Complex," J. Polym. Sci., B., Polymer Letters, p. 363-368, (1964).

EPO, "Supplemntary Eurpean Search report for EP 00980058.2-2115-JP0008770 mailed Mar. 1, 2005,".

* cited by examiner

*Primary Examiner*—Randy Gulakowski
*Assistant Examiner*—Alicia M Toscano
(74) *Attorney, Agent, or Firm*—Darby & Darby P.C.

(57) ABSTRACT

It is an object of the present invention to provide molecular compounds useful in the fields of state-of the-art materials, such as formulations, waste water treatments, energy transducers, conductors and bio-model reactions, in a way that interaction points and forces working inside polymer assemblies are fixed as well as controlled so that constituent polymers are aligned and modified. It is also an object of the present invention to provide methods for aligning and/or modifying polymers having hydrogen bond sites. A molecular compound is produced from a tetrakis aryl compound represented by Formula (I) (wherein, X is $(CH_2)_n$, or p-phenylene; n is 0, 1, 2 or 3; Y is hydroxyl, carboxyl or optionally substituted amino: and $R^1$ and $R^2$ are each hydrogen, lower alkyl, optionally substituted phenyl, halogen or lower alkoxy) and a polymer having hydrogen bond sites, such as polyethers, polyalcohols or polyamines.

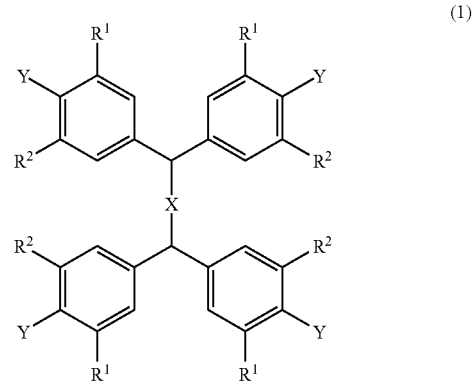

3 Claims, 24 Drawing Sheets

MOLECULAR COMPOUNDS CONTAINING POLYMERS HAVING HYDROGEN BOND SITES AS THE CONSTITUENT COMPOUNDS

CROSS REFERENCE TO RELATED APPLICATION

This is a continuation-in-part of U.S. application Ser. No. 10/149,617, filed Jun. 11, 2002, now abandoned which claims the benefit of International Application Number PCT/JP00/08770, filed Dec. 12, 2000, which in turn claims the benefit of Japanese Patent Application No. Hei 11-353738, filed Dec. 13, 1999.

FIELD OF INVENTION

The present invention relates to novel molecular compounds. In more detail, it relates to molecular compounds consisting of self-associating compounds with 4 or more diffusive hydrogen bond sites and polymers having hydrogen bond sites, and to methods for aligning and modifying polymers having hydrogen bond sites with the self-associating compounds with 4 or more diffusive hydrogen bond sites.

BACKGROUND ART

Molecular compounds are molecular assemblies that two or more compounds are bound through relatively weak interactions, other than covalent bonds, represented by hydrogen bonds or van der Waals forces. Molecular compounds containing polymers as constituent compounds are expected to have polymer effects in addition to molecular alignment controls due to intermolecular interactions. Because of this, the molecular compounds have attracted attentions ill recent years as a technique for constructing composite materials called composites, polymer alloys or hybrids. Higher functions given when forming composite are closely related to molecular alignment controls of polymers in polymer assemblies. For example, biomolecules are often involved in expressing functions by becoming composite with or assembling with other molecules, rather than functioning alone. Another example is that, as seen in nucleic acids, a assembly itself plays important roles in expressing higher functions in many cases. As described above, phenomena of polymer assemblies not only are mere interests as materials but also are expected as fields with potentials beyond our present common knowledge, such as retaining and transferring information and formation of specific sites.

Polymer assemblies are formed based on weak, secondary, non-covalent bonding forces working between chains or in a chain, such as Coulomb forces, hydrogen bonding forces, hydrophobic bonding forces, charge transfer bonding forces and van der Waals forces. In particular, assemblies based on hydrogen bonds, which are direction-specific interactions, are expected to be a promising technique to promote highly functional materials by means of forming composites, thanks to the relationship between molecular alignment controls and functions, which has attracted attention in recent years.

A concrete example of polymer assemblies is a complex between polymers. For example, a polymer assembly of poly-methacrylic acid and poly(N-vinylpyrolidone) via cooperative hydrogen bonds is known to have very interesting physico-chemical and dynamic properties that are completely different from those of constituent polymers [Makromol. Chem., Rapid Commun., Vol. 1. Page 591 (1980)]. A assembly of polymethacrylic acid mid polyethylene glycol, formed via a similar interaction, has been reported to be a mechanochemical system having a deforming function responding to the environment, which is not found in the constituent polymers [Makromol. Chem., Vol. 176. Page 2761 (1975)].

Such assemblies based on complexes between polymers exist in various forms ranging from very regular shapes such as polymer crystals, polymer liquid crystals or regular higher-order structures composed of assembled subunits found in certain types of biomolecules, to irregular ones found in phase separation phenomena, such as precipitate, gel, coacervate and emulsion.

An effect of a molecular compound containing polymers as constituent compounds comes from the large molecular weights and multi-functionality of polymers: Interactions, separations and cooperative actions, based on functional groups arranged freely in space, are exemplified as polymer effects. However, it is difficult to fix interaction points and to control interaction forces among polymers of which many functional groups exist densely on a single, flexible chain. Therefore it is not satisfactory with respect to stably producing molecular compounds with fixed compositions and structures.

A complex between a low molecule mid a polymer, utilizing interactions with the low molecule is known as a method for controlling the chain structure of the constituent polymer. This method using low molecules, which are easily designed and handled, can easily create a large variety of structures relating to expressing functions, and has attracted attention as a method for aligning and modifying a polymer, in such a way that the constituent polymer is crystallized, made to have a higher melting point or made insoluble due to pseudo crosslinking. Almost no compositions are brown to be widely used in general mid be good for practical use in terms of industrial and basic materials. Only a few examples have been disclosed, including, as those based on van der Waals forces, complexes containing polyethylene oxide mid urea as constituent compounds [J. Polym. Sci., B. Vol. 2. Page 363 (1964)], those containing polyethylene and urea as constituent compounds [J. Macromol. Sci. Phys., Vol. 8. Page 277 (1973)], those containing syndiotactic polystyrene and benzene, and an aromatic hydrocarbon such as toluene or iodine or carbon tetrachloride, as constituent compounds [Polymer, Vol. 34, No. 23. Page 4841 (1993)], and crystalline molecular compounds containing polyethylene oxide and p-dihalogenobenzenes as constituent compounds [Polymer Communications, Vol. 32, No. 15, Page 477 (1991)]; and, as those based on hydrogen bonds, those containing polyethylene imine and water as constituent compounds [Macromolecule. Vol. 14. Page 315 (1981)], those containing polyethylene oxide and hydroquinone, resorucinol or p-nitrophenol as constituent compounds [Macromol. Symp., Vol. 114. Page 51 (1997)] and crystalline molecular compounds containing poly(N-vinylpyrolidone) and 3,5-dihydroxybenzoic acid [Supramolecular Science. Vol. 2, Page 41 (1995)].

In Japanese Laid-Open Patent Application No. Hei 7-331002 (Yamagishi et al.), a resin composition is disclosed which is obtained by adding pentaerythritol to a styrene resin having a carboxylic group. However, this document relates to the improvement of stiffness and fluidity of the styrene resin as a thermoplastic molding material, and does not relate to a molecular compound which is highly aligned by hydrogen bonds as in the present invention.

In Japanese Laid-Open Patent Application No. Hei 2-34813 (Asahina), a resin composition used for sealing a semiconductor is disclosed which includes (a) a denatured epoxy resin, (b) a maleimide resin, (c) a polyphenol resin, and (d) inorganic filler. In this document, the polyphenol resin is used as a hardening agent which reacts with the epoxy resin, and hence, this invention does not relate to a molecular compound which is highly aligned by hydrogen bonds as in the present invention.

In EP 0 397 395 (Kitahara), a resin composition used for sealing a semiconductor is disclosed which includes (a) a polymaleimide compound and (b) phenols as A component and inorganic filler as B component. In this document, also, the phenols are merely added as a hardener.

In U.S. Pat. No. 3,836,590 (Brindell), it is described that a certain polyphenol compound is effective as an antioxidant for organic materials. However, Examples thereof only show polymers having no hydrogen bonding sides, such as polyisoprene or polypropylene, and do not relates to a molecular compound which is highly aligned by hydrogen bonds as in the present invention.

Functions of the polymer assemblies based on the complexes between low molecules and polymers are determined depending on how the low molecules coordinate to the polymers. It becomes therefore very important to control association forms between low molecules and polymers when polymer assemblies are designed and manufactured. It is however difficult to produce polymer assemblies with fixed compositions and structures selectively and stably, because known complexes between low molecules and polymers, based on van der Waals forces are weakly direction-specific in molecular associations. In known complexes between low molecules and polymers, based on hydrogen bonds, constituent polymers applicable with low molecules are very restricted. Besides, functional groups in low molecules, which rule hydrogen bonds, are not arranged properly in terms of directions in the actions. Functions supposed from hydrogen-bonding associations between low molecules and polymers have not been expressed satisfactorily.

In recent years, polymer assemblies based on complexes between low molecules and polymers have attracted attention particularly with respect to functionalities in formulations, waste water treatments, energy transducers, conductors, bio-model reactions and the like. There is only a very little information on roles played by low molecules as well as on solid structures. Compositions that are very satisfactory from the viewpoint of industrially valuable materials have not been found yet.

DISCLOSURE OF THE INVENTION

It is an object of the present invention to provide molecular compounds useful in the fields of state-of-the-art materials, such as formulations, waste water treatments, energy transducers, conductors and bio-model reactions, in a way that interaction points and forces working inside polymer assemblies are fixed and further controlled so that constituent polymers are aligned and modified. It is also an object of the present invention to provide methods for aligning and/or modifying polymers having hydrogen bond sites.

To solve the above problems, the inventors have studied in earnest, and found that it was easy and efficient to control the molecular alignment of hydrogen bonding polymers and modify the polymers, which are very important for building composite materials, if diffusive hydrogen bonds are present between molecules in polymer assemblies. Factors controlling the diffusive hydrogen bonds between molecules were studies in detail. As a result, it was found that self-associating compounds having 4 or more diffusive hydrogen bond sites formed, with a wide range of hydrogen bonding polymers, stable molecular compounds that were excellent in moldability and had regular domains, and that the obtained molecular compounds had excellent properties useful in the fields of state-of-the-art materials such as formulations, waste water treatments, energy transducers, conductors and bio-model reactions. Thus the present invention has been completed.

The present invention relates to a molecular compound consisting of a self-associating compound with 4 or more diffusive hydrogen bond sites and a polymer having hydrogen bond sites; a molecular compound in which the self-associating compound with 4 or more diffusive hydrogen bond sites is a tetrakis aryl compound represented by Formula (1) [wherein, X is $(CH_2)_n$ or p-phenylene; n is 0, 1, 2 or 3; Y is hydroxyl, carboxyl or optionally substituted amino; and $R^1$ and $R^2$ are each hydrogen, lower alkyl, optionally substituted phenyl, halogen or lower alkoxy]; and a molecular compound in which the polymer having hydrogen bond sites is one or more polymers selected from the group consisting of polyethers, polyalcohols, polyamines, polyphenols, polyacrylic acids, polyvinyl ethers, polyvinyl ketones, polyvinyl heterocyclic compounds, polycarboxylic acid vinyls, polysaccharides and polyamino acids.

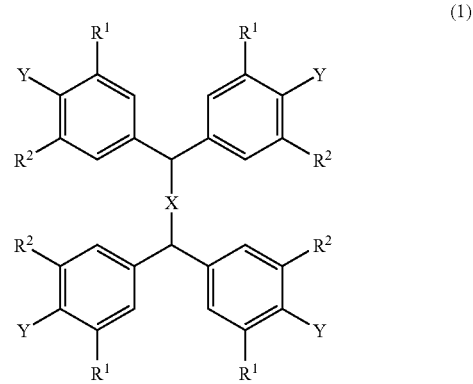

(1)

The present invention also relates to a method for aligning and/or modifying a polymer having hydrogen bond sites with a self-associating compound with 4 or more diffusive hydrogen bond sites; a method for aligning and/or modifying in which the self-associating compound with 4 or more diffusive hydrogen bond sites is a tetrakis aryl compound represented by Formula (1); and a method for the alignment and/or modification in which the polymer having hydrogen bond sites is one or more polymers selected from the group consisting of polyethers, polyalcohols, polyamines, polyphenols, polyacrylic acids, polyvinyl ethers, polyvinyl ketones, polyvinyl carboxylic acids, polyvinyl heterocyclic compounds, polycarboxylic acid vinyls, polysaccharides and polyamino acids.

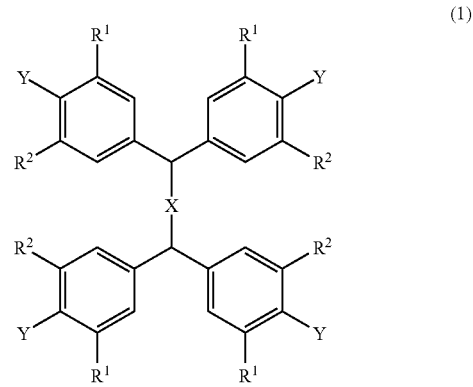

(1)

The molecular compounds of the present invention are a compound that two or more constituent compounds able to exist stably on their own and containing one or more polymers are bound via hydrogen bonds. Examples of the compound include hydrates, solvates, adducts, clathrate compounds, molecular composites, polymer blends and polymer alloys.

Furthermore, the molecular compounds of the present invention are usually crystalline solids, and may be amorphous or oily, or sometimes polymorphic. They exist in various forms, such as liquid crystal, gel, coacervate and emulsion. Regardless of these forms, any molecular compounds containing self-associating compounds with 4 or more diffusive hydrogen bond sites and polymers having hydrogen bond sites as constituent compounds are all covered by the present invention.

The self-associating compounds with 4 or more diffusive hydrogen bond sites are not particularly limited and may be arbitrary selected as long as the compound has 4 or more functional groups, within the molecule, which form hydrogen bonding, and the functional groups are of diffusive type which may be self-associate between molecules so that a molecular compound may be formed with a polymer having hydrogen bond sites. In this specification, the term "self-associate" means the formation of hydrogen bonds between the same kind of molecules. Also, the molecular weight of "low molecular compound" is less than 1500, preferably less than 1000, and more preferably less than 700.

In a tetrakis aryl compound represented by Formula (1) of the present invention, X is $(CH_2)_n$ or p-phenylene; n is 0, 1, 2 or 3; Y is hydroxyl, carboxyl or optionally substituted amino; and $R^1$ and $R^2$ are each hydrogen, lower alkyl, optionally substituted phenyl, halogen or lower alkoxy. There are no restrictions on tetrakis aryl compounds of the present invention if the compounds have 4 or more hydrogen bonding functional groups in the molecules, are of diffusive type that the functional groups can self-associate between molecules, and can form molecular compounds with polymers having hydrogen bond sites. One or more appropriate compounds can be selected for use.

Examples of tetrakis aryl compounds used in the present invention include
1,1,2,2-tetrakis(4-hydroxyphenyl)ethane, 1,1,2,2-tetrakis(3-methyl-4-hydroxyphenyl)ethane,
1,1,2,2-tetrakis(3,5-dimethyl-4-hydroxyphenyl)ethane,
1,1,2,2-tetrakis(3-chloro-4-hydroxyphenyl)ethane,
1,1,2,2-tetrakis(3,5-dichloro-4-hydroxyphenyl)ethane,
1,1,2,2-tetrakis(3-bromo-4-hydroxyphenyl)ethane,
1,1,2,2-tetrakis(3,5-dichloro-4-hydroxyphenyl)ethane,
1,1,2,2-tetrakis(3-t-butyl-4-hydroxyphenyl)ethane,
1,1,2,4'-tetrakis(3,5-di-t-butyl-4-hydroxyphenyl)ethane,
1,1,2,2-tetrakis(3-fluoro-4-hydroxyphenyl)ethane,
1,1,2,2-tetrakis(3,5-difluoro-4-hydroxyphenyl)ethane.
1,1,2,2-tetrakis(3-methoxy-4-hydroxyphenyl)ethane,
1,1,2,2-tetrakis(3,5-dimethoxy-4-hydroxyphenyl)ethane,
1,1,2,2-tetrakis(3-phenyl-4-hydroxyphenyl)ethane,
1,1,2,2-tetrakis(3,5-diphenyl-4-hydroxyphenyl)ethane,
1,1,2,2-tetrakis(3-fluoro-5-methyl-4-hydroxyphenyl)ethane,
1,1,2,2-tetrakis(3-chloro-5-methyl-4-hydroxyphenyl)ethane,
1,1,2,2-tetrakis(3-bromo-5-methyl-4-hydroxyphenyl)ethane,
1,1,2,2-tetrakis(3-methoxy-5-methyl-4-hydroxyphenyl)ethane,
1,1,2,2-tetrakis(3-t-butyl-5-methyl-4-hydroxyphenyl)ethane,
1,1,2,2-tetrakis(3-phenyl-5-methyl-4-hydroxyphenyl)ethane,
1,1,2,2-tetrakis(3-chloro-5-bromo-4-hydroxyphenyl)ethane and
1,1,2,2-tetrakis(3-chloro-5-phenyl-4-hydroxyphenyl)ethane, Examples of tetrakis aryl compounds used in the present invention also include
1,1,3,3-tetrakis(4-hydroxyphenyl)propane, 1,1,3,3-tetrakis(3-methyl-4-hydroxyphenyl)propane,
1,1,3,3-tetrakis(3,5-dimethyl-4-hydroxyphenyl)propane,
1,1,3,3-tetrakis(3-chloro-4-hydroxyphenyl)propane,
1,1,3,3-tetrakis(3,5-dichloro-4-hydroxyphenyl)propane,
1,1,3,3-tetrakis(3-bromo-4-hydroxyphenyl)propane,
1,1,3,3-tetrakis(3,5-dibromo-4-hydroxyphenyl)propane,
1,1,3,3-tetrakis(3-phenyl-4-hydroxyphenyl)propane,
1,1,3,3-tetrakis(3,5-diphenyl-4-hydroxyphenyl)propane,
1,1,3,3-tetrakis(3-methoxy-4-hydroxyphenyl)propane,
1,1,3,3-tetrakis(3,5-dimethoxy-4-hydroxyphenyl)propane,
1,1,3,3-tetrakis(3-t-butyl-4-hydroxyphenyl)propane, and
1,1,3,3-tetrakis(3,5-di-t-butyl-4-hydroxyphenyl)propane, Examples of tetrakis alkyl compounds used in the present invention also include
1,1,4,4-tetrakis(4-hydroxyphenyl)butane, 1,1,4,4-tetrakis(3-methyl-4-hydroxyphenyl)butane.
1,1,4,4-tetrakis(3,5-dimethyl-4-hydroxyphenyl)butane,
1,1,4,4-tetrakis(3-chloro-4-hydroxyphenyl)butane,
1,1,4,4-tetrakis(3,5-dichloro-4-hydroxyphenyl)butane,
1,1,4,4-tetrakis(3-methoxy-4-hydroxyphenyl)butane,
1,1,4,4-tetrakis(3,5-dimethoxy-4-hydroxyphenyl)butane,
1,1,4,4-tetrakis(3-bromo-4-hydroxyphenyl)butane,
1,1,4,4-tetrakis(3,5-dibromo-4-hydroxyphenyl)butane,
1,1,4,4-tetrakis(3-t-butyl 4-hydroxyphenyl)butane, and
1,1,4,4-tetrakis(3,5-t-butyl-4-hydroxyphenyl)butane.

Examples of tetrakis aryl compounds used in the present invention also include
1,1,4,4-tetrakis(4-hydroxyphenyl)pentane, 1,1,5,5-tetrakis(3-methyl-4-hydroxyphenyl)pentane,
1,1,5,5-tetrakis(3,5-dimethyl-4-hydroxyphenyl)pentane,
1,1,5,5-tetrakis(3-chloro-4-hydroxyphenyl)pentane.
1,1,5,5-tetrakis(3,5-dichloro-4-hydroxyphenyl)pentane,
1,1,5,5-tetrakis(3-methoxy-4-hydroxyphenyl)pentane,
1,1,5,5-tetrakis(3,5-dimethoxy-4-hydroxyphenyl)pentane,
1,1,5,5-tetrakis(3-bromo-4-hydroxyphenyl)pentane,
1,1,5,5-tetrakis(3,5-dibromo-4-hydroxyphenyl)pentane.
1,5,5-tetrakis(3-t-butyl-4-hydroxyphenyl)pentane, and
1,1,5,5-tetrakis(3,5-di-t-butyl-4-hydroxyphenyl)pentane.

Examples of tetrakis aryl compounds used in the present invention also include
α,α,α',α'-tetrakis(4-hydroxyphenyl)-p-xylene,
α,α,α',α'-tetrakis(3-methyl-4-hydroxyphenyl)-p-xylene,
α,α,α',α'-tetrakis(3,5-dimethyl-4-hydroxyphenyl)-p-ethane,
α,α,α',α'-tetrakis(3-chloro-4—hydroxyphenyl)-p-xylene,
α,α,α',α'-tetrakis(3,5-dichloro-4-hydroxyphenyl)-p-xylene.
α,α,α',α'-tetrakis(3-bromo-4-hydroxyphenyl)-p-xylene,
α,α,α',α'-tetrakis(3,5-dibromo-4-hydroxyphenyl)-p-xylene,
α,α,α',α'-tetrakis(3-t-butyl-4-hydroxyphenyl)-p-xylene,
α,α,α',α'
(3,5-di-t-butyl-4-hydroxyphenyl)-p-xylene,α,α,α',α'-tetrakis(3-fluoro-4-hydroxyphenyl)-p-xylene,
α,α,α',α'-tetrakis(3,5-difluoro-4-hydroxyphenyl)-p-xylene,
α,α,α',α'-tetrakis(3-dimethoxy-4-hydroxyphenyl)-p-xylene,
α,α,α',α'-tetrakis(3,5-dimethoxy-4-hydroxyphenyl)-p-xylene,
α,α,α',α'-tetrakis(3-phenyl-4-hydroxyphenyl)-p-xylene,
α,α,α',α'-tetrakis(3,5-diphenyl-4-hydroxyphenyl)-p-xylene, α,α,α',α'-tetrakis(3-fluoro-5-methyl-4-hydroxyphenyl)-p-xylene.
α,α,α',α'-tetrakis(3-chloro-5-methyl-4-hydroxyphenyl)-p-xylene.
α,α,α',α'-tetrakis(3-bromo-5-methyl-4-hydroxyphenyl)-p-xylene,
α,α,α',α'-tetrakis(3-methoxy-5-methyl-4-hydroxyphenyl)-p-xylene,
α,α,α',α'-tetrakis(3-t-butyl-5-methyl-4-hydroxyphenyl)-p-xylene.
α,α,α',α'-tetrakis(3-chloro-5-bromo-4-hydroxyphenyl)-p-xylene and
α,α,α',α'-tetrakis(3-chloro-5-phenyl-4-hydroxyphenyl)-p-xylene.

Examples of tetrakis aryl compounds used in the present invention also include
1,1,2,2-tetrakis(4-carboxyphenyl)ethane, 1,1,2,2-tetrakis(3-methyl-4-carboxyphenyl)ethane,
1,1,2,2-tetrakis(3,5-dimethyl-4-carboxyphenyl)ethane,
1,1,2,2-tetrakis(3-chloro-4-carboxyphenyl)ethane,
1,1,2,2-tetrakis(3,5-dichloro-4-carboxyphenyl)ethane.
1,1,2,2-tetrakis(3-bromo-4-carboxyphenyl)ethane.
1,1,2,2-tetrakis(3,5-dibromo-4-carboxyphenyl)ethane,
1,1,2,2-tetrakis(3-t-butyl-4-carboxyphenyl)ethane,
1,1,2,2-tetrakis(3,5-di-t-butyl-4-carboxyphenyl)ethane,
1,1,2,2-tetrakis(3-fluoro-4-carboxyphenyl)ethane,
1,1,2,2-tetrakis(3,5-difluoro-4-carboxyphenyl)ethane,
1,1,2,2-tetrakis(3-methoxy-4-carboxyphenyl)ethane,
1,1,2,2-tetrakis(3,5-dimethoxy-4-carboxyphenyl)ethane,
1,1,2,2-tetrakis(3-phenyl-4-carboxyphenyl)ethane.
1,1,2,2-tetrakis(3,5-diphenyl-4-carboxyphenyl)ethane,
1,1,2,2-tetrakis(3-fluoro-5-methyl-4-carboxyphenyl)ethane.
1,1,2,2-tetrakis(3-chloro-5-phenyl-4-carboxyphenyl)ethane,
1,1,2,2-tetrakis(3-bromo-5-methyl-4-carboxyphenyl)ethane,
1,1,2,2-tetrakis(3-methoxy-5-methyl-4-carboxyphenyl)ethane,
1,1,2,2-tetrakis(3-t-butyl-1-methyl-4-carboxyphenyl)ethane,
1,1,2,2-tetrakis(3-phenyl-5-methyl-4-carboxyphenyl)ethane,
1,1,2,2-tetrakis(3-chloro-5-bromo-4-carboxyphenyl)ethane,
1,1,2,2-tetrakis(3-chloro-5-phenyl-4-carboxyphenyl)ethane,
1,1,2,2-tetrakis(4-aminophenyl)ethane,
1,1,2,2-tetrakis(3-methyl-4-aminophenyl)ethane,
1,1,2,2-tetrakis(3,5-dimethyl-4-aminophenyl)ethane, 1,1,2,2-tetrakis(3-chloro-4-aminophenyl)ethane,
1,1,2,2-tetrakis(3,5-dichloro-4-aminophenyl)ethane, 1,1,2,2-tetrakis(3-bromo-4-aminophenyl)ethane,
1,1,2,2-tetrakis(3,5-dibromo-4-aminophenyl)ethane, 1,1,2,2-tetrakis(3-t-butyl-4-aminophenyl)ethane,
1,1,2,2-tetrakis(3,5-di-t-butyl-4-aminophenyl)ethane,
1,1,2,2-tetrakis(3-fluoro-4-aminophenyl)ethane, 1,1,2,2-tetrakis(3,5-difluoro-4-aminophenyl)ethane,
1,1,2,2-tetrakis(3-methoxy-4-aminophenyl)ethane,
1,1,2,2-tetrakis(3,5-dimethoxy-4-aminophenyl)ethane,
1,1,2,2-tetrakis(3-phenyl-4-aminophenyl)ethane,
1,1,2,2-tetrakis(3,5-diphenyl-4-aminophenyl)ethane,
1,1,2,2-tetrakis(3-fluoro-5-methyl-4-aminophenyl)ethane,
1,1,2,2-tetrakis(3-chloro-5-methyl-4-aminophenyl)ethane,
1,1,2,2-tetrakis(3-bromo-5-methyl-4-aminophenyl)ethane,
1,1,2,2-tetrakis(3-methoxy-5-methyl-4-aminophenyl)ethane,
1,1,2,2-tetrakis(3-t-butyl-5-methyl-4-aminophenyl)ethane,
1,1,2,2-tetrakis(3-phenyl-5-methyl-4-aminophenyl)ethane,
1,1,2,2-tetrakis(3-chloro-5-bromo-4-aminophenyl)ethane and
1,1,2,2-tetrakis(3-chloro-5-phenyl-4-aminophenyl)ethane.

Of the above tetrakis aryl compounds represented by Formula (1) and used in the present invention. 1,1,2,2-tetrakis(4-hydroxyphenyl)ethane, 1,1,2,2-tetrakis(3-methyl-4-hydroxyphenyl)ethane, 1,1,4,4-tetrakis(4-hydroxy)phenyl)butane, 1,1,5,5-tetrakis(4-hydroxyphenyl)pentane, 1,1,2,2-tetrakis(4-carboxyphenyl)ethane and 1,1,2,2-tetrakis(4-aminophenyl)ethane are particularly preferred from the viewpoint of performances such as molecular alignment, chemical stabilization and modification of the polymers having hydrogen bond sites.

The tetrakis aryl compounds of the present invention are usually crystalline solids, and may be amorphous or oily, or sometimes polymorphic. Regardless of these forms, the tetrakis aryl derivatives of Formula (1) are all covered by the present invention.

As for a polymer having hydrogen bond sites and used in the present invention, one or more appropriate polymers can be selected for use from known polymers having hydrogen bond sites and that can be classified into any of polyethers, polyalcohols, polyamines, polyphenols, polyacrylic acids, polyvinyl ethers, polyvinyl ketones, polyvinyl heterocyclic compounds, polycarboxylic acid vinyls, polysaccharides and polyamino acids. There are no particular restrictions on the polymers having hydrogen bond sites if they form molecular compounds with tetrakis aryl compounds represented by the said Formula (1) and used in the present invention, whether they are single polymers or copolymers. Examples of such polymers are described in the following: Polyethers include polyoxymethylene, polyacetal, polyethylene oxide, polyethylene glycol, polybutylene glycol, polytetramethylene oxide, polyoxymethylene alkyl ethers polyoxyethylene alkyl ethers, polyoxyethylene alkyphenyl ethers, polyethylene glycol fatty acid esters, polyoxyethylene castor oil, polyoxyethylene hardened castor oil, polyoxyethylene alkylamines, polyoxyethylene fatty acid amides, polyoxyethylene alkylphenylformamide condensates, polyethylene glycol dialkyl ethers, polyethylene glycol dilaurate, polyoxyethylene glycol dioleate, polyethylene glycol distearate, polyethylene glycol diacrylate, polyethylene glycol dimethacrylate, polyethylene glycol dibenzoate, polyethylene glycol diglycidyl ether, polyethylene glycol divinyl ether, polyethylene glycol-n-alkylsulfopropyl ethers, polyethylene glycol biphenyl ether methacrylate, polyethylene glycol bisaminopropylterminate, polyethylene glycol bis(carboxymethyl) ether, polyethylene glycol bisethylhexanoate, polypropylene oxide, polypropylene glycol, polypropylene glycol monoalkyl ethers, polypropylene glycol dialkyl ethers, polypropylene glycol fatty acid esters, polypropylene glycol acrylate, polypropylene glycol diacrylate, polyethylene glycol dibenzoate, polyethylene glycol diglycidyl ether, oxyethylene glycol-oxypropylene glycol copolymers, oxyethylene glycol-oxypropylene glycol copolymers, oxyethylene-oxypropylene glycol copolymers, oxyethylene-oxypropylene alkyl ether copolymers, polyether rubber, crown ethers and polymers substituted with crown ethers.

Polyalcohols include polyvinyl alcohol and vinyl alcohol-vinyl pyrolidone copolymers. Polyamines include polyethylene imine, poly(N-acetylethylene inline), poly(N-formylethylene imine), polyvinyl amine and poly(N,N-dimethyl-N',N',N",N"-tetramethylene phosphoramide). Polyphenols include polyvinyl phenol, polyphenol imine diethanol isophthalate and phenol-formaldehyde resins. Polyacrylic acids include polyacrylic acid, polymethacrylic acid, polyitaconic acid, polymethyl methacrylate, polymethyl methacrylate, polyacrylamide, polydimethylaminoethyl methacrylate, polyhydroxyethyl acrylate, poly N-hydroxymethylacrylamide), poly(N-hydroxyethylacrylamide), poly(N-iso-propylacrylamide), polyglycidyl methacrylate, polymethoxypolyethylene glycol monomethacrylate and poly(diethoxy-n-methylitaconate).

Polyvinyl ethers include polyvinyl methyl ether, polyvinyl ethyl ether, polyvinyl-iso-butyl ether, polyvinyl acetal, polyvinyl butyl, polyvinyl formal and polyethoxy-ethoxy-ethoxyvinyl ether. Polyvinyl ketones include polyvinyl methyl ketone and polyvinyl phenyl ketone. Polyvinyl heterocyclic compounds include polyvinyl pyrrolidone, polyvinyl pyridine, polyvinyl piperazine, polyvinyl imidazole, polyvinyl imidazoline, polyvinyl carbazole, polyvinyl adenine and polyvinyl cytosine. Polycarboxylic acid vinyls include polyvinyl acetate, polyvinyl cinnamate and maleic anhydrate-vinyl acetate copolymers. Polysaccharides include starch, amylose, cycloamylose, amiropectin, cellulose, alginic acid, glycogen, chitin and hyaluronic acid. Polyamino acids include polyglycine, polyserine, polylysine, oxytocin and polyglutamic acid.

A polymer used in the present invention is a compound consisting of molecules that a large number of one type or several types of constituent units are mutually combined via chemical bonds. In more detail, it refers to a compound that the number of the constituent units does not affect the properties of the molecules. There are no particular restrictions on the molecular weight of a polymer used in the present invention if the polymer forms a molecular compound with a tetrakis aryl compound of the said Formula (1). Polymers having molecular weights particularly in the range of 200 to 2,000,000 are preferably used from the viewpoint of forming direction-specific hydrogen bonds and performances such as organization, chemical stabilization and modification due to the formation.

A molecular compound of the present invention may be produced in a way that a tetrakis aryl compound of the said Formula (1) and a polymer having hydrogen bond sites and forming a molecular compound, such as those described above, are directly mixed or are mixed in water or organic solvents, or by a casting method in which the two compounds are mixed in water or organic solvents followed by gradual evaporation of the solvents. It is possible to produce a molecular compound consisting of multiple constituents of 3 or more by reacting 2 or more types of polymers with a tetrakis aryl compound. It is also possible to produce a target molecular compound by that a molecular compound consisting of a tetrakis aryl derivative and a specific polymer having hydrogen bond sites is first formed, and then the obtained molecular compound is reacted with another polymer having hydrogen bond sites according to a method mentioned above. Furthermore, a molecular compound containing ions, molecules or the like as third components can be produced in a way that ions, molecules or the like are additionally added as third components to a tetrakis aryl derivative and a polymer having hydrogen bond sites and are reacted according, to such methods as those mentioned above.

A molecular compound of the present invention may vary in a ratio of constituent compounds composing it, depending on conditions, it can be con firmed that a substance obtained according to a method mentioned above is surely a molecular compound by such techniques as thermal analysis (TG/DTA), infrared absorption spectra (IR), X-ray diffraction patterns and $^{13}$C-CP/MAS-solid-state NMR spectra. The composition of a molecular compound can be confirmed by thermal analysis, $^1$H-NMR spectra, gel permeation chromatography (GPC), high performance liquid chromatography (HPLC), elementary analysis and the like.

The molecular compounds of the present invention are preferably used in any form including crystal, liquid crystal, gel, precipitated solid, coacervate, emulsion and liquid. It is however preferable that the compounds are of solid forms, such as crystal, liquid crystal, gel or precipitated solid, from the viewpoint of functions such as basic materials for formulations, waste water treating materials, energy transducers, conductors and bio-model reaction sites and for the purposes of producing stable molecular compounds excellent in moldability and with regular domains and fixed compositions. When crystalline, the same molecular compound may be polymorphic. X-ray diffraction patterns are mainly examined to check whether a compound is crystalline. A solid structure containing a polymorphic compound can be confirmed by such a means as X-ray diffraction patterns, $^{13}$C-CP/MAS-solid-state NMR spectra, polarization microscope and election microscope. Intermolecular interactions in a molecular compound can be confirmed using infrared absorption spectra (IR) and $^{13}$C-CP/MAS solid state NMR spectra.

The method of tie present invention for aligning and/or modifying a polymer is characterized in that the conformation and assembly form of a polymer having hydrogen bond sites, that is, a hydrogen bonding polymer, which is one of the components of a molecular compound, is controlled, depending on the characteristics of a tetrakis aryl compound used. In the methods of the present invention for aligning and/or modifying polymers, whether a polymer composing a molecular compound can take a target structure depends on a form of the hydrogen bond between each tetrakis aryl molecule and the polymer. In other words, the molecular compound of the present invention is a multi-molecular assembly that a tetrakis aryl compound and a hydrogen bonding polymer are associated via hydrogen bonds. When a self-associating, low molecular compound having diffusive hydrogen bond sties is reacted to a hydrogen bonding polymer, direction-specific hydrogen bonds are formed between polymers and at regular intervals in polymer, chains so as to make the polymer orientation and organization. Thus it becomes possible to align and modify the hydrogen bonding polymer.

For example, when a tetrakis aryl compound working only as a proton donor to a hydrogen bonding polymer is used, the polymer chains are aligned and organized and the polymer structure is optimized according to the regular domains formed due to the association among the tetrakis aryl molecules. On the other hand, if a tetrakis aryl compound working as both a proton donor and proton acceptor to a hydrogen bonding polymer is used, the tetrakis aryl molecule and polymer are regularly aligned and organized alternatively by three-dimensionally developed hydrogen bonds to form a stable molecular compound.

For example, when 1,1,2,2-tetrakis(4-hydroxyphenyl)ethane (TEP), % which is a tetrakis aryl compound working as a proton donor to polyethylene oxide (PEO), is reacted with PEO at a ratio of ethylene oxide (EO) unit/TEP=5 to 15, the EO chains are oriented and organized with rapid exchange between the gauche and trans conformations, according to the three-dimensional lattice space formed by the hydrogen bonds between TEP molecules. As a result, a stable TEP-PEO molecular compound having a melting point of 160° C. or above is formed. On the other hand, when TEP working, as both a proton donor and proton acceptor to polyethylene imine (PEI) is reacted with PET at a ratio of ethylene imine (ET) unit/TEP=5 to 15, the EI chains are oriented and organized by the three-dimensional hydrogen bonds formed alternatively between PEI and TEP molecules so that an extremely stable TEP-PEI molecular compound with a decomposition point of 250° C. or above is formed. As described above, in the methods of the present invention for aligning and modifying polymers utilizing the formation of molecular compounds, it becomes possible to align and modify a hydrogen bonding polymer with functions that have been difficult to control, if a self-associating, low molecule with diffusive hydrogen bond sites is present when the polymer assembles.

There are no particular restrictions on how to use the molecular compounds of the present invention. For example, two or more types of molecular compounds, each consisting of different constituent compounds, can be mixed for use. The molecular compounds of the present invention can be used together with other substances, whether inorganic or organic, as long as they do not damage target functions, and can also be used by adding to resins, coatings, and, their materials and material compositions. In addition, the molecular compounds of the present invention can be used as base materials or excipients for the chemical stabilization, non-volatilization, pulverization, granulation and making tablets, of functional substances, or as gelling agents to gel liquid substances. In addition, tie molecular compounds of the present invention can also be used as clathrate compounds containing atoms or molecules. A clathrate compound here refers to a substance of which there are holes of appropriate size inside three-dimensional structures formed by atoms or molecules bound and other atoms or molecules are placed inside the holes by means of non-covalent interactions at a fixed composition ratio. Tile molecular compounds of the present invention used as three-dimensional structures having inner holes may be formed from 3 or more constituent compounds. Atoms or molecules to be included inside are not necessarily single ones but two or more. The molecular compounds of the present invention can also be used as media to transfer functional substances or as specific reaction sites.

For example, a tetrakis aryl compound of the said Formula (1) and a hydrogen bonding polymer are reacted according to one of direct mixing, solvent and casting methods in the presence of a pyrethroid type pesticide such as Allethrin; quaternary ammonium salt type bactericide such as benzalkonium chloride or cetyl pyridinium chloride; antimicrobial antimolding agent such as 5-chloro-2-methyl-4-isothiazolin-3-one, 2-methyl-4-isothiazolin-3-one, zinc-2-pyridinethiol-1-oxide, 2,2'-dithiobis(pyridin-N-oxide), 2-bromo-2-nitropropan-1,3-diol or 2,3,3-triiodoallyl alcohol: terpene type perfume such as hinokitiol, cineole, citronellol or geraniol; or metal salt such as lithium perchlorate, sodium iodide, potassium iodide, sodium thiocyanate or potassium thiocyanate. Then, a gel or solid molecular compound can be produced, stably containing the said pesticide, bactericide, antimicrobial antimolding agent, perfume or metal salt, in the polymer assembly phase.

It can be confirmed that the substance obtained according to the method is surely a molecular compound by such a means as terminal analysis (TG/DTA), infrared absorption spectra (IR), X-ray diffraction patterns and $^{13}$C-CP/MAS solid state NMR spectra. The composition of the molecular compound can be confirmed by thermal analysis, atomic absorption analysis, elementary analysis and the like.

Molecular compounds, such as those mentioned above, are given functions including slow release, reduction of skin irritation, chemical stabilization, non-volatilization, pulverization, ionization aid selective separation of useful substances, in addition to the actions that the pesticide, bactericide, antimicrobial antimolding agent, perfume or metal salt has originally. Therefore, the molecular compounds are extremely useful as functional materials with new properties.

BRIEF DESCRIPTIONS OF FIGURES

BEST FORM TO IMPLEMENT THE INVENTION

The present invention is further described in reference to Examples. The present invention is not however limited by these examples at all.

EXAMPLE 1

Preparation of molecular compounds containing 1,1,2,2-tetrakis(4-hydroxyphenyl)ethane (TEP) and polyethers as constituent compounds (Part 1)

2.5 mmol (1.0 g) of TEP and 5.0 mmol (5.0 g) of polyethylene glycol having an average molecular weight of 1.000 (PEG 1,000) were added to 10 ml of water and heated to dissolve. The resulting solution was left to stand for 3 hours at room temperature. The deposited white solid was separated by filtration and dried under reduced pressure at 45° C. for 2 hours using a rotary vacuum pump, to give a molecular compound of a composition ratio of TEP and the ethylene oxide (EO) unit of 1:8 (molar ratio). Then, the same procedure was repeated except that PEG having an average molecular weight of 500,000 (PEG 500,000) was used instead of PEG 1,000, to give a molecular compound of a composition ratio of TEP and the EO unit of 1:8 (molar ratio). The same procedure was repeated except that polyethylene glycol dimethyl ether having an average molecular weight of 2,000 (PEGDME) was used instead of PEG 500,000, to give a molecular compound of the composition ratio of TEP and the EO unit of 1:8 (molar ratio). Further, the same procedure was repeated except that a block copolymer of polyethylene glycol (PEG)-polypropylene glycol (PPG) with an average molecular weight of 2.500 (75% PEG product, PEGPPO 2,500) was used instead of PEGDME 2,000, to give a Molecular compound of a composition ratio of TEP and PEGPPO 2,500 of 1:0.8 (molar ratio). Each of the obtained compounds was confirmed to be the molecular compound of the said composition by thermal analysis (TG/DTA), $^1$H-NMR and X-ray diffraction patterns. It was also confirmed that each molecular compound had direction-specific intermolecular hydrogen bonds and orientating EO chains with rapid exchange between the gauche and trans conformations, from the wagging vibration absorption band of C—H of O—(CH$_2$)$_2$—O, which was observed near 1360 cm$^{-1}$ on the infrared absorption spectra (IR), and the signal of the methylene carbon of —CH$_2$—O—CH$_2$—, which was observed near 70 ppm on the $^{13}$C-CP/MAS solid state NMR spectra.

Figure 1:
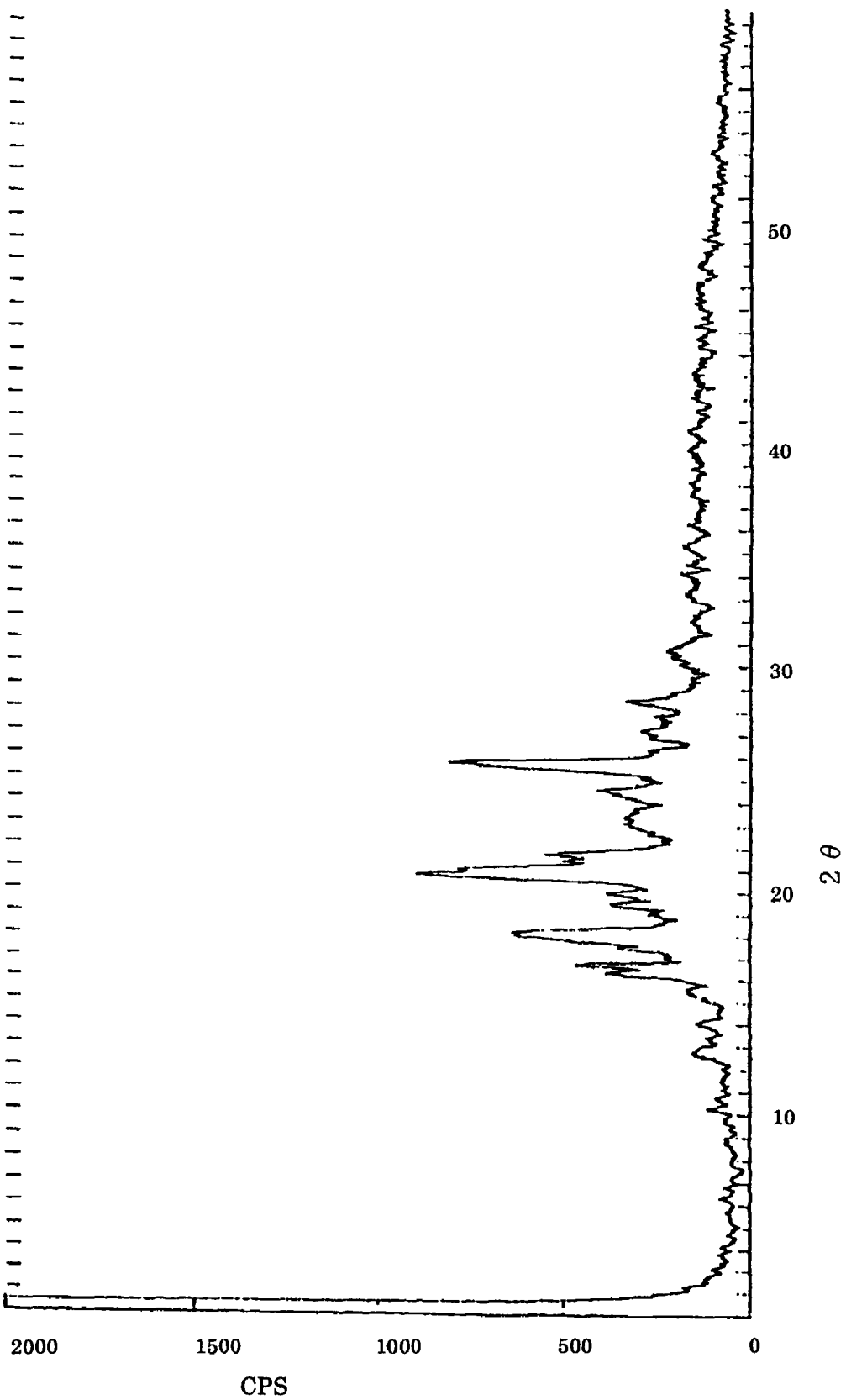
FIG. 1 shows an X-ray diffraction pattern (measured at 25° C.) of powder of the molecular compound consisting of TEP and PEG 1.000 [composition ratio of TEP and EO unit: 1:8 (molar ratio)], obtained in Example 1 of the present invention.
Figure 2:
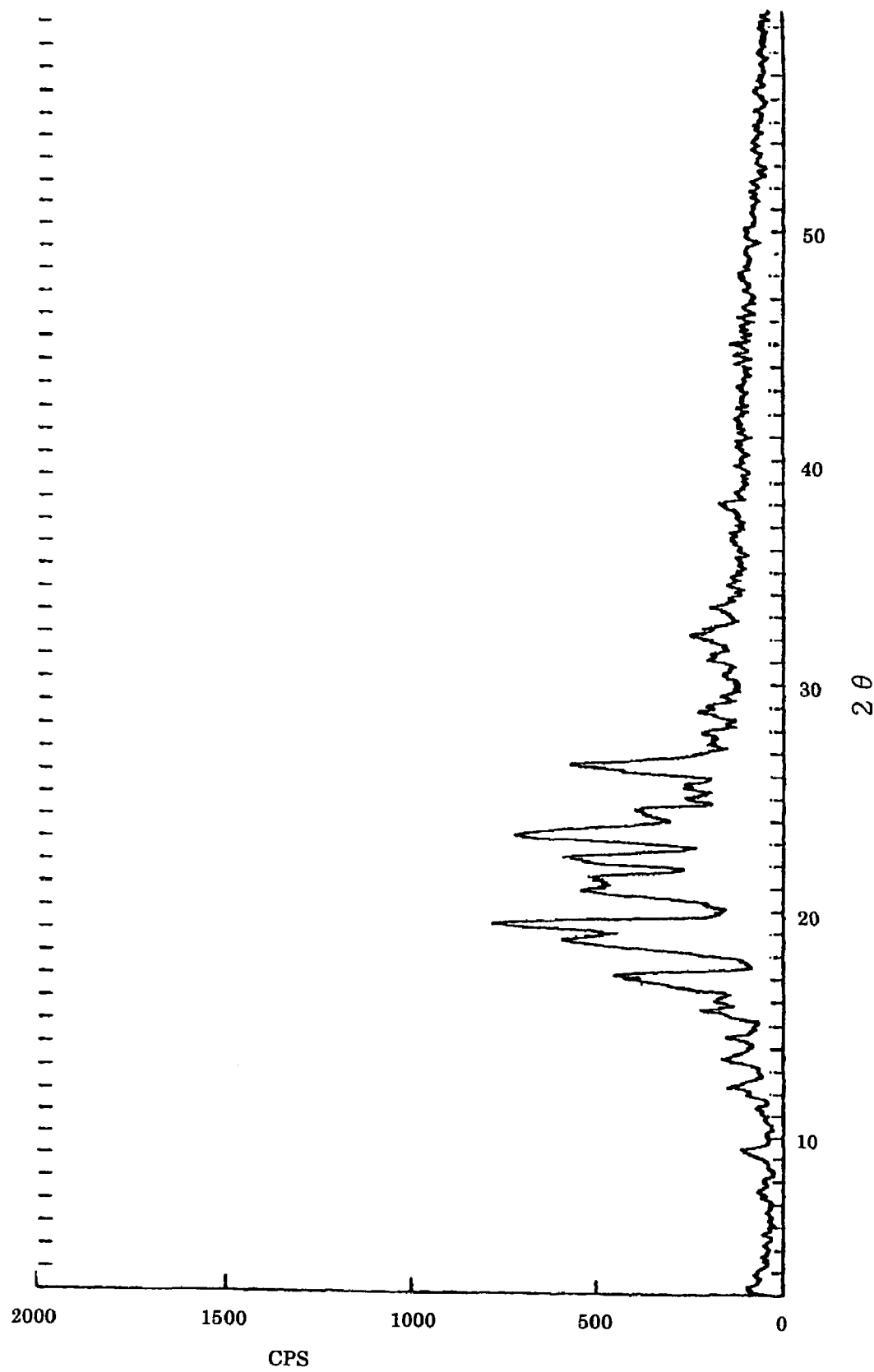
FIG. 2 shows an X-ray diffraction pattern (measured at 25° C.) of powder of the molecular compound consisting of TEP and PEG 500,000 [composition ratio of TEP and EO Unit: 1:8 (molar ratio)], obtained in Example 1 of the present invention.
Figure 3:
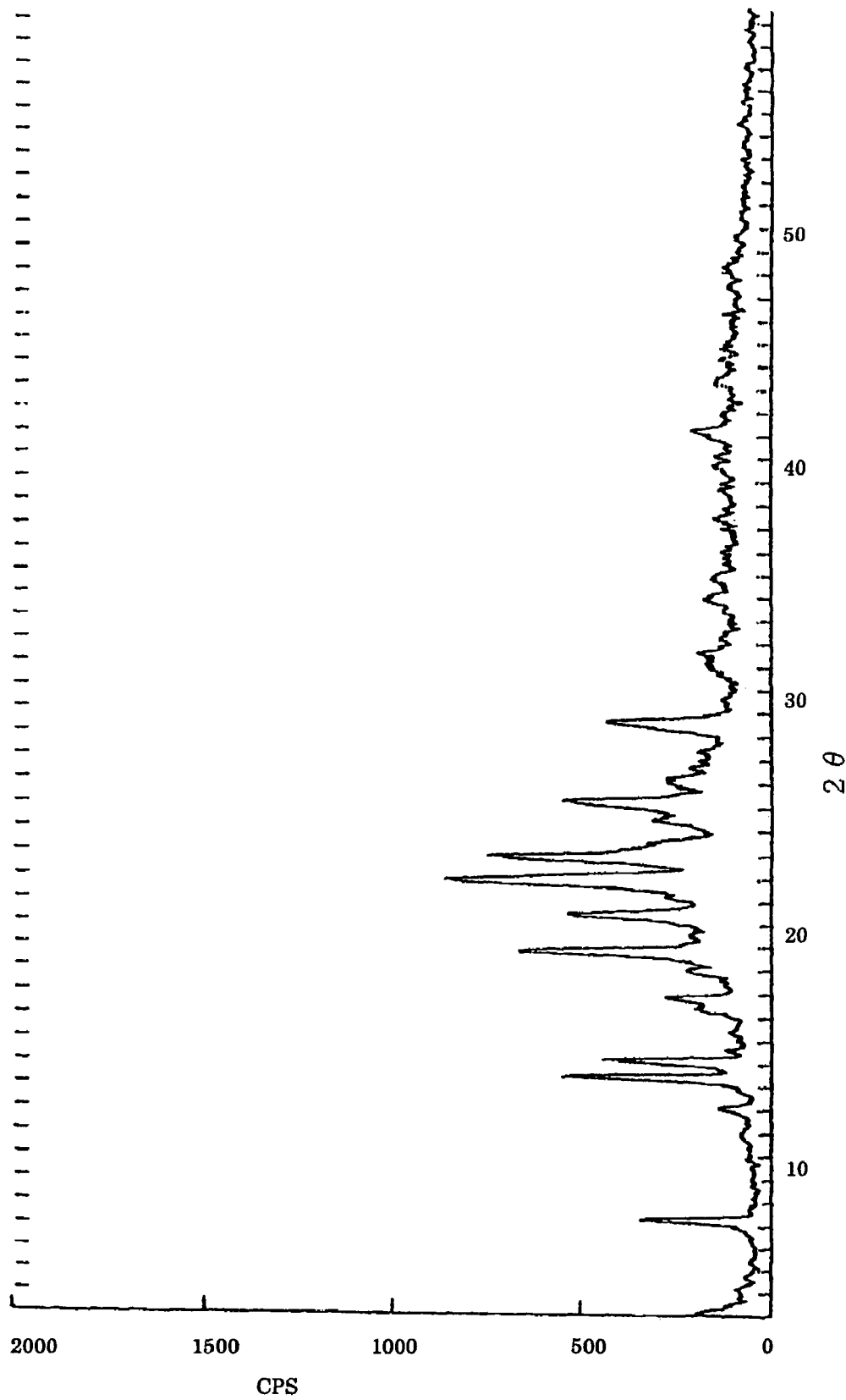
FIG. 3 shows an X-ray diffraction pattern (measured at 25° C.) of powder of the molecular compound consisting of TEP and PEGDME 2,000 [composition ratio of TEP and EO unit: 1:8 (molar ratio)], obtained in Example 1 of tile present invention.
Figure 4:
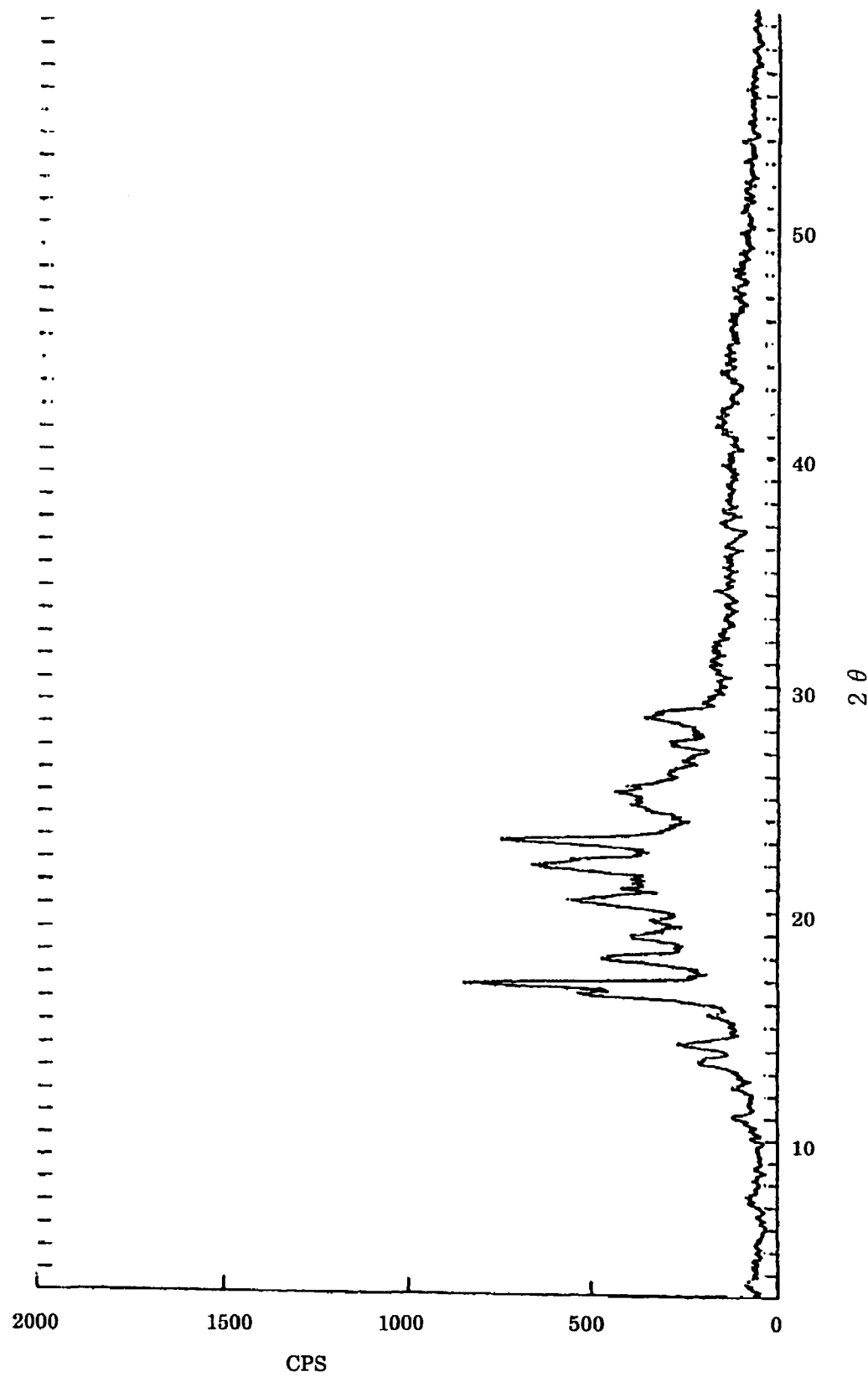
FIG. 4 shows an X-ray diffraction pattern (measured at 25° C.) of powder of the molecular compound consisting of TEP and PEGPPO 2,500 at a composition ratio of 11:0.8 (molar ratio), obtained in Example 1 of tile present invention.
Figure 5:
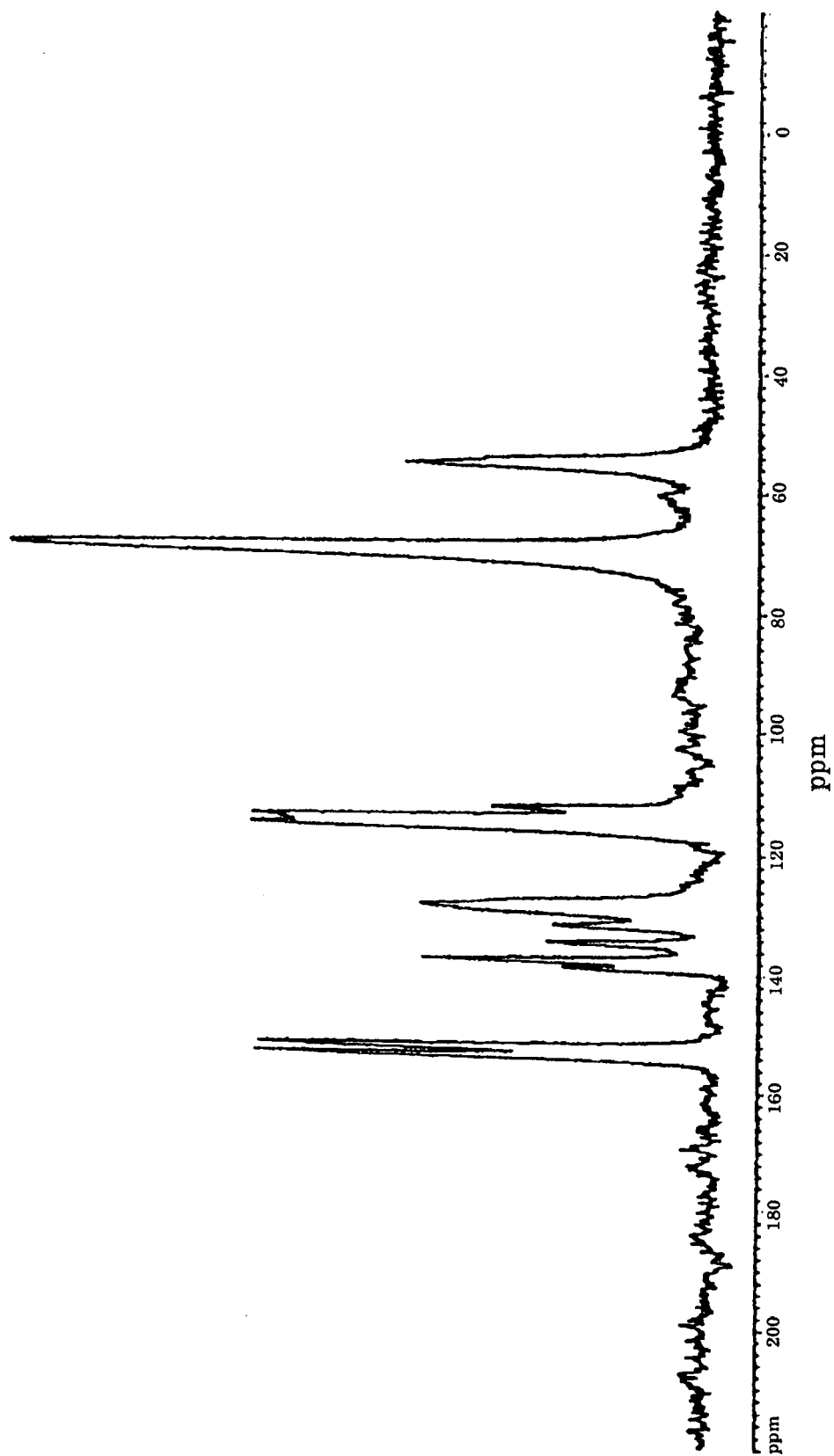
FIG. 5 shows a $^{13}$C-CP/MAS solid state NMR spectrum (measured at 27° C. at the rotational frequency of rotor of 3.5 kHz) of the molecular compound consisting of TEP and PEG 1000 [composition ratio of TEP and EO unit: 1:8 (molar ratio)], obtained in Example 1 of the present invention.
Figure 6:
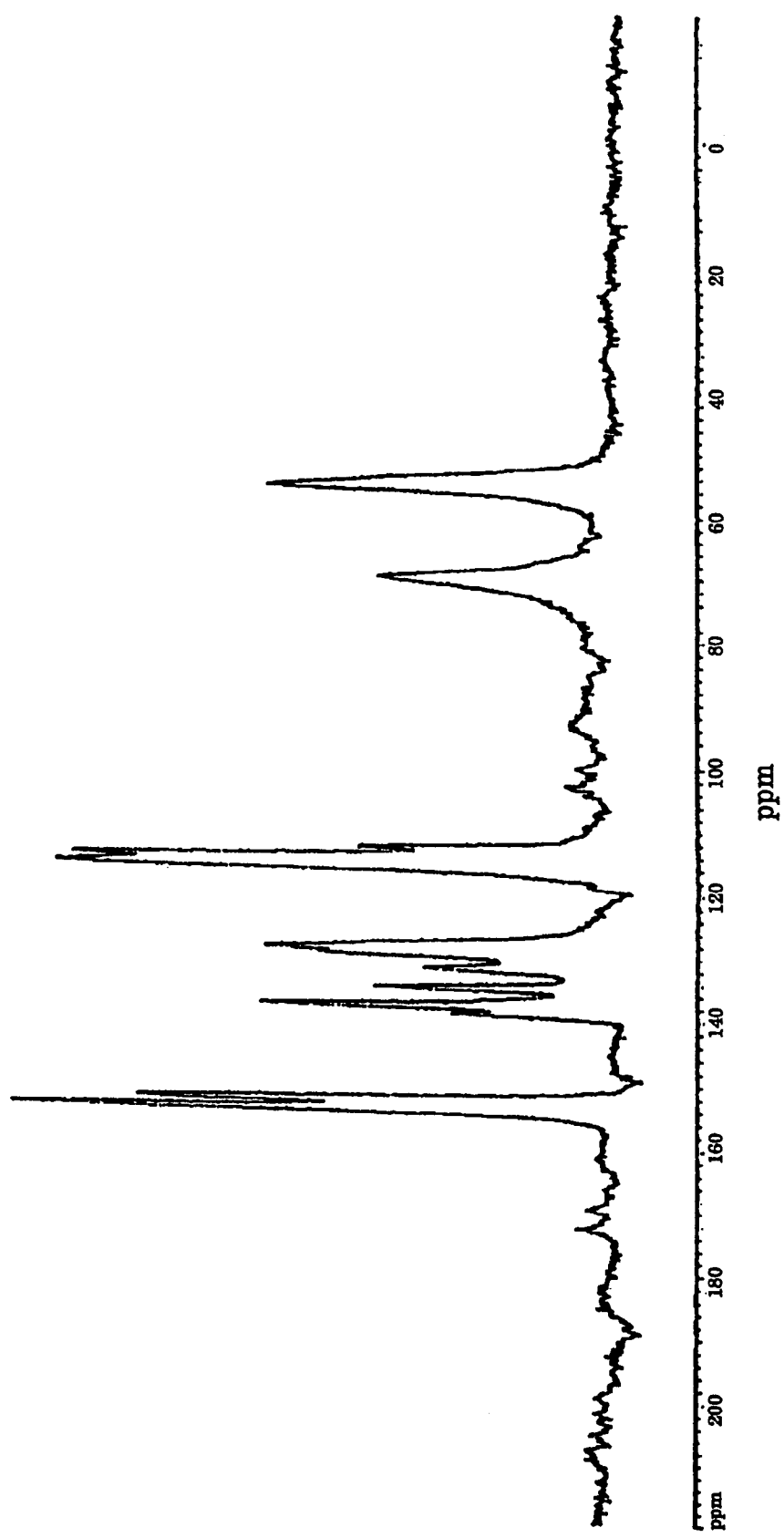
FIG. 6 shows a $^{13}$C-CP/MAS solid stale NMR spectrum (measured at 27° C. at the rotational frequency of rotor of 3.5 kHz) of the molecular compound consisting of TEP and PEG 500.000 [composition ratio of TEP and EO unit: 1:8 (molar ratio)], obtained in Example 1 of the present invention.
Figure 7:
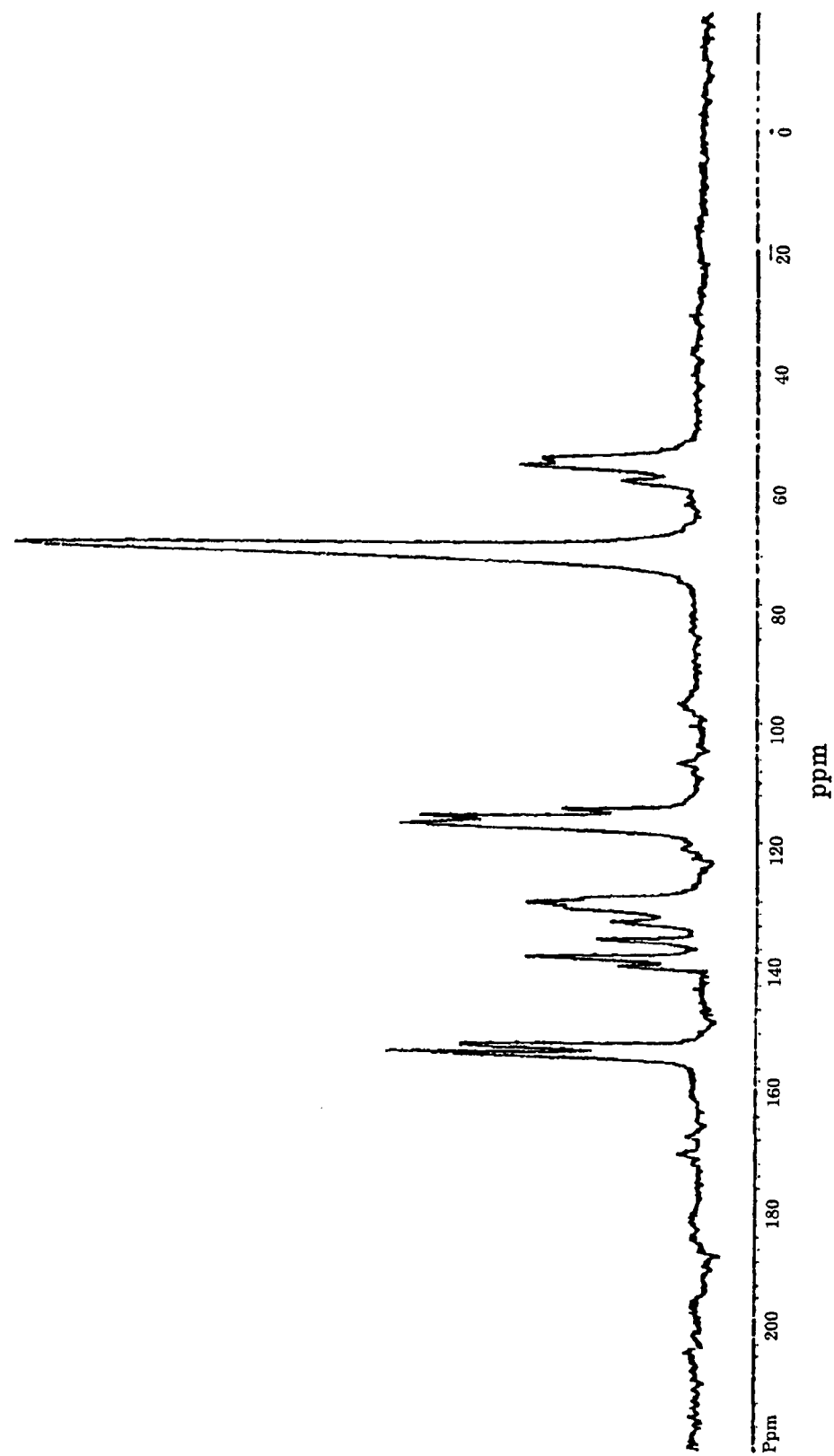
FIG. 7 shows a $^{3}$C-CP/MAS solid state NMR spectrum (measured at 27° C. at tie rotational frequency of rotor of 3.5 kHz) of the molecular compound consisting of TEP and PEGDME 2,000 [composition ratio of TEP and EO unit: 1:8 (mole ratio)], obtained in Example 1 of the present invention.
Figure 8:
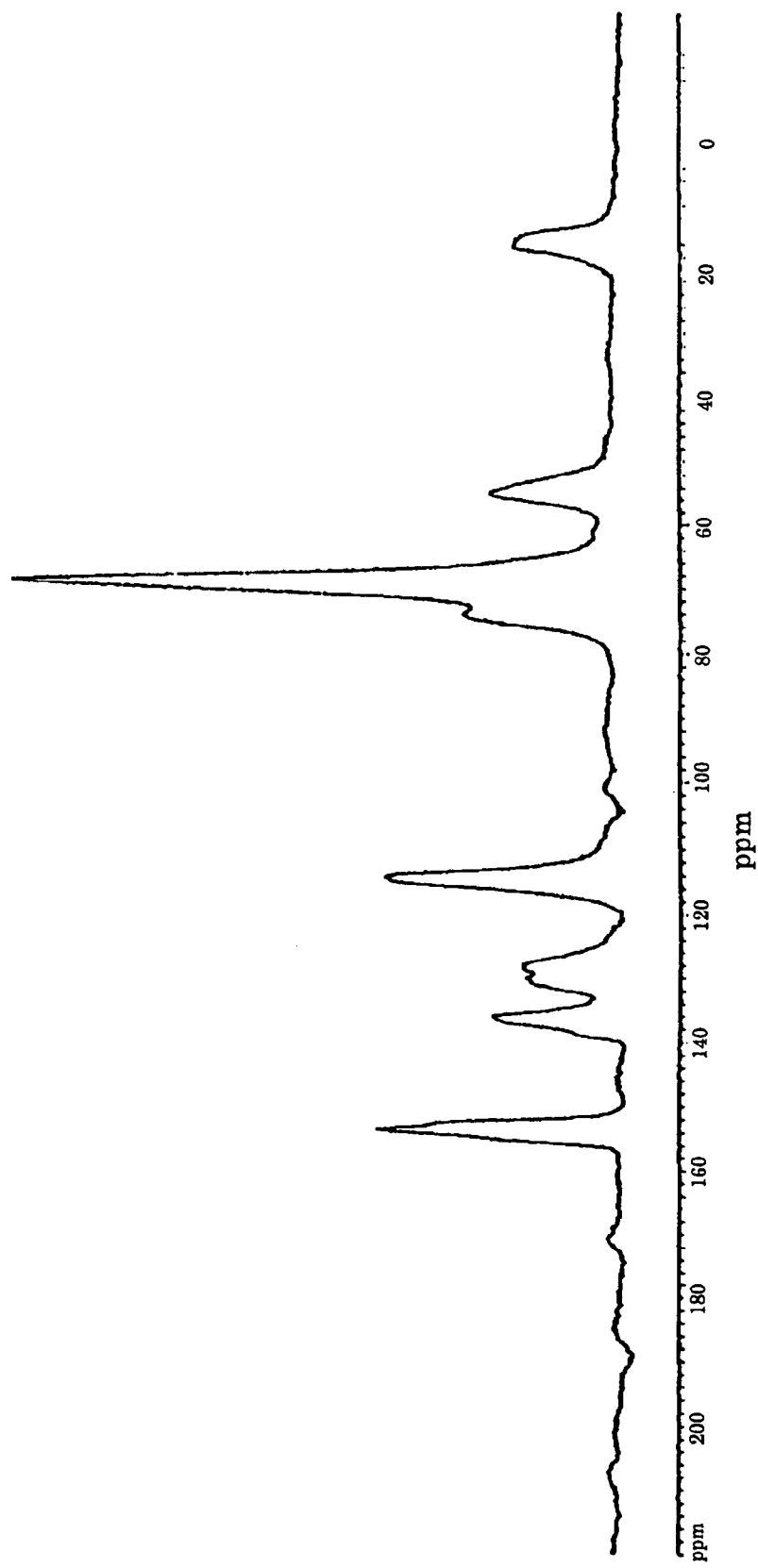
FIG. 8 shows a $^{13}$C-CP/MAS solid state NMR spectrum (measured at 27° C. at the rotational frequency of rotor of 3.5 kHz) of the molecular compound consisting of TEP and PEG-PPO 2.500 at a composition ratio of 1:0.8 (molar ratio), obtained in Example 1 of tie present invention.
Figure 9:
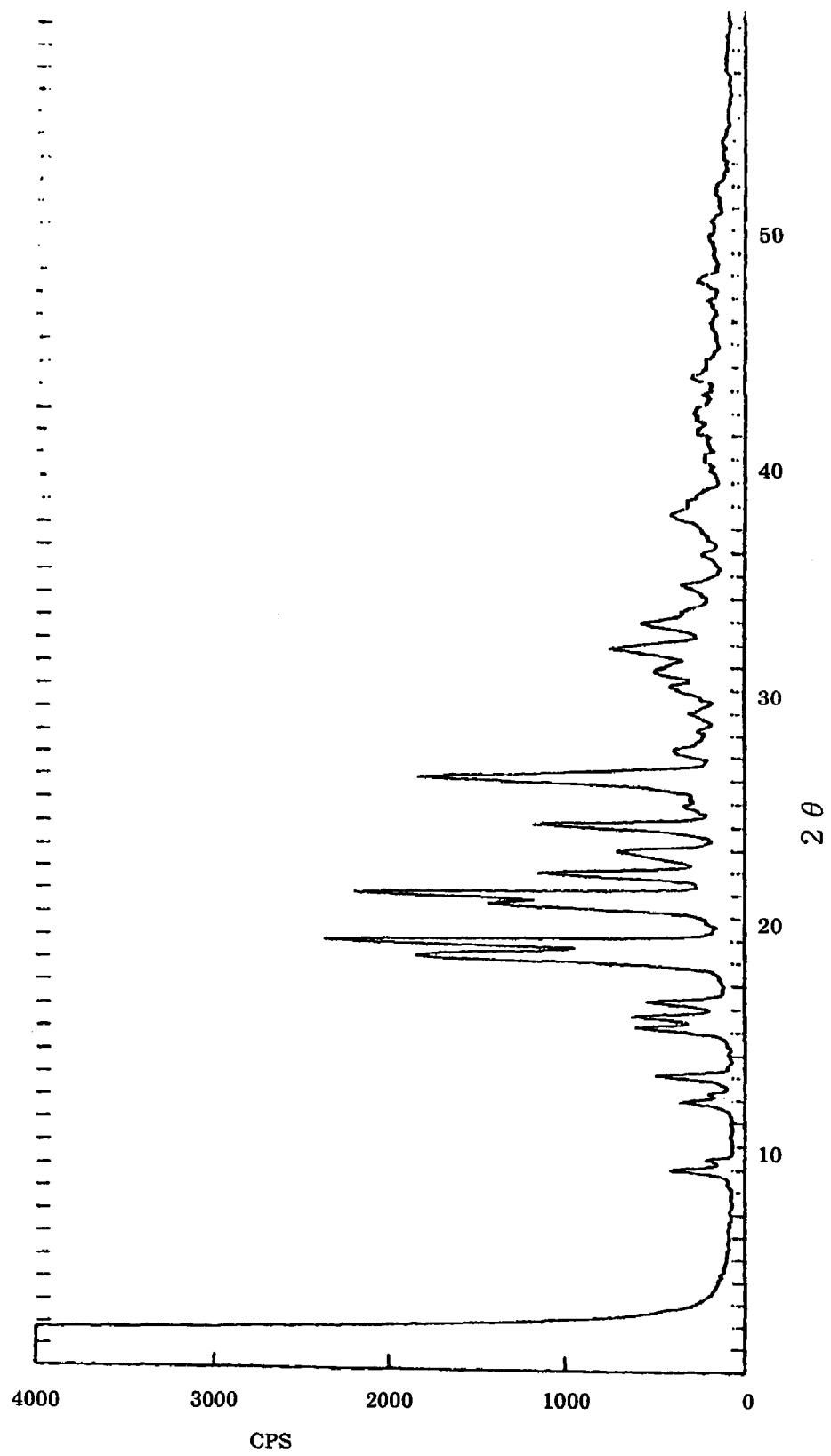
FIG. 9 shows an X-ray diffraction pattern (measured at 25° C.) of powder of TEP used in Example 1 of the present invention.
Figure 10:
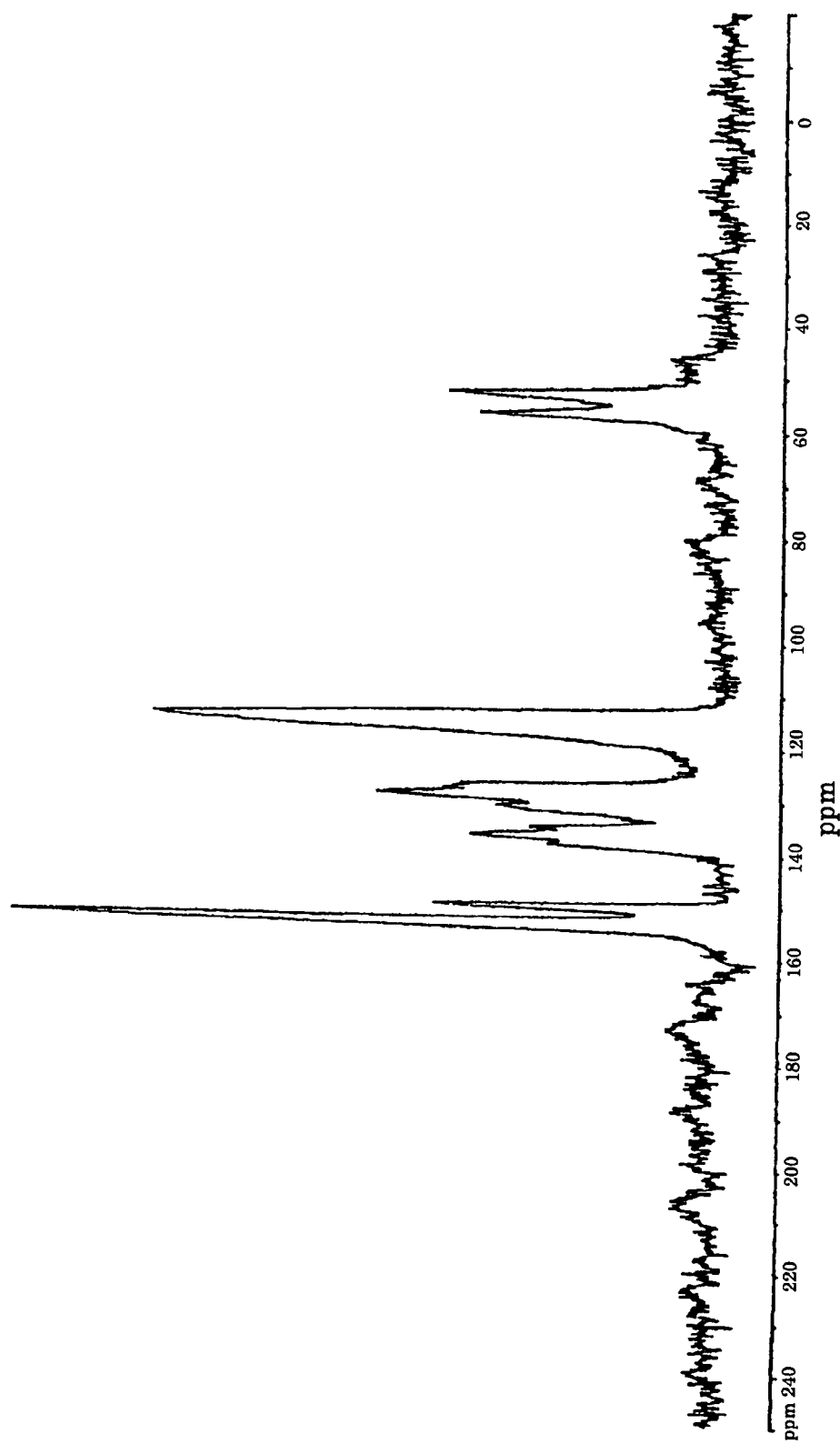
FIG. 10 shows a $^{13}$C-CP/MAS solid state NMR spectrum (measured at 27° C. at the rotational frequency of rotor of 3.5 kHz) of TEP used in Example 1 of the present invention.

The molecular compounds melted each in the range of 145° C. and 155° C. 163° C. and 172° C., 168° C. and 173° C., and 132° C. and 145° C. respectively. FIGS. 1 to 4 show X-ray diffraction patterns of powder of the molecular compounds of TEP-PEG 1.000, TEP-PEG 500,000, TEP-PEGDME 2.000 and TEP-PEGPPO 2,500, respectively. Further; their $^{13}$C-CP/MAS solid state NMR spectra are shown in FIGS. 5 to 8. For comparison, an X-ray diffraction pattern of TEP powder is shown in FIG. 9, and a $^{13}$C-CP/MAS solid state NMR spectrum in FIG. 10. PEG 1,000. PEG 500,000 and PEGDME 2,000 each have melting points in the range of approximately 30° C. and 65° C. PEGPPO 2,500 is a viscous liquid at ordinary temperature. As described above, when the molecular compounds of the present invention were formed, the liquid polyether and polyethers with low melting points were aligned and organized so as to become highly resistant to heat, be made stronger and have flexible structures.

EXAMPLE 2

Preparation of a molecular compound containing 1,1,2,2-tetrakis(4-hydroxyphenyl)ethane (TEP) and a polyether as constituent compounds (Part 2)

3.1 mmol (1.25 g) of TEP and 0.05 mmol (10 g) of PEG having an average molecular weight of 20,000 were added to 70 ml of ethyl acetate and heated to dissolve. The resulting solution was left to stand for 24 hours at room temperature. The deposited white solid was separated by filtration and dried under reduced pressure at 45° C. for 2 hours using a rotary vacuum pump, to give a molecular compound of a composition ratio of TEP and the ethylene oxide (EO) unit of 1:7 (molar ratio). Tile obtained compound was confirmed to be the molecular compound of the said composition by $^1$H-NMR and X-ray diffraction patterns. It was also confirmed that the molecular compound had direction-specific intermolecular hydrogen bonds and orientating EO chains with rapid exchange between the gauche and trans conformations, from the wagging vibration absorption band of C—H of O—(CH$_2$)$_2$—O, which was observed near 1360 cm$^{-1}$ on the infrared absorption spectra (IR), and the signal of the methylene carbon of —CH$_2$—O—CH$_2$—, which was observed near 70 ppm on the $^{13}$C-CP/MAS solid state NMR spectra. The molecular compound melted in the range of 175° C. and 180° C. As described above, when the molecular compound of the present invention was formed, PEG with a low melting point was aligned and organized so as to become highly resistant to heat, be made stronger and have a flexible structure.

EXAMPLE 3

Preparation of a molecular compound containing 1,1,2,2-tetrakis(4-hydroxyphenyl)ethane (TEP) and a polyether as constituent compounds (Part 3)

2.5 mmol (1.0 g) of TEP and 5.0 mmol (5.0 g) of polytetramethylene oxide having an average molecular weight of 1,000 (PTMO) were added to 10 ml of benzene and heated to dissolve. The resulting solution was left to stand for 24 hours at room temperature. The deposited white solid was separated by filtration and dried wide reduced pressure at 45° C. for 2 hours rising a rotary vacuum pump to give a molecular compound of a composition ratio of TEP and the tetramethylene oxide (TMO) unit of 1:4 (molar ratio). The obtained compound was confirmed to be the molecular compound of the said composition by $^1$H-NMR and X-ray diffraction patterns. It was also confirmed that the molecular compound had direction-specific intermolecular hydrogen bonds and orientating TMO chains with rapid exchange between the gauche and trans conformations, from the wagging vibration absorption band of C—H of O—(CH$_2$)$_4$—O, which was observed near 1360 cm$^{-1}$ on the infrared absorption spectra (IR) and the signal of tie methylene carbon of —CH$_2$—O—CH$_2$—, which was observed near 70 ppm on the $^{13}$C-CP/MAS solid state NMR spectra. The molecular compound melted in the range of 278° C. and 297° C. As described above, when the molecular compound of the present invention was formed, PTMO with a low melting point was aligned and organized so as to become highly resistant to heat, be made stronger and have a flexible structure.

EXAMPLE 4

Preparation of a molecular compound containing 1,1,2,2-tetrakis(4-hydroxyphenyl)ethane (TEP) and a polyether as constituent compounds (Part 4)

1.3 mmol (0.5 g) of TEP and 0.00025 mmol (0.5 g) of PEG having an average molecular weight of 2,000,000 were added to 50 ml of methanol and heated to dissolve. The density of the resulting solution was measured to be 500 ml by a B8R type rotational viscometer (made by Tokyo Keiki Co., Ltd.; rotor No. 1). A Teflon sheet of 0.08 mm thick was attached with a double-sided tape on a flat Pyrex Petri dish of 105 mm in diameter. The obtained solution was dropped to coat over the sheet with a Pasteur pipette. Methanol was gradually vaporized on a hot plate heated to about 40° C. When almost all the methanol was removed, the residue was further dried under reduced pressure at room temperature for 30 minutes using a rotary vacuum pump, to give a transparent cast film of a composition ratio of TEP and the EO unit of 1:9 (molar ratio). The obtained cast film was confirmed to be the molecular compound of the said composition by $^1$H-NMR and X-ray diffraction patterns. It was also confirmed that the cast film had direction-specific intermolecular hydrogen bonds and orientating EO chains with rapid exchange between the gauche and trans conformations, from the wagging vibration absorption band of C—H of O—(CH$_2$)—O, which was observed near 1360 cm$^{-1}$ on the infrared absorption spectra (FR), and the signal of the methylene carbon of —CH$_2$—O—CH$_2$—, which was observed near 70 ppm on the $^{13}$C-CP/MAS solid state NMR spectra. The molecular compound melted in the range of 140° C. and 180° C. As described above, when the molecular compound of the present invention was formed, PEG with a low melting point was aligned and organized to make film, and became highly resistant to heat, was made stronger and had a flexible structure.

EXAMPLE 5

Figure 11:
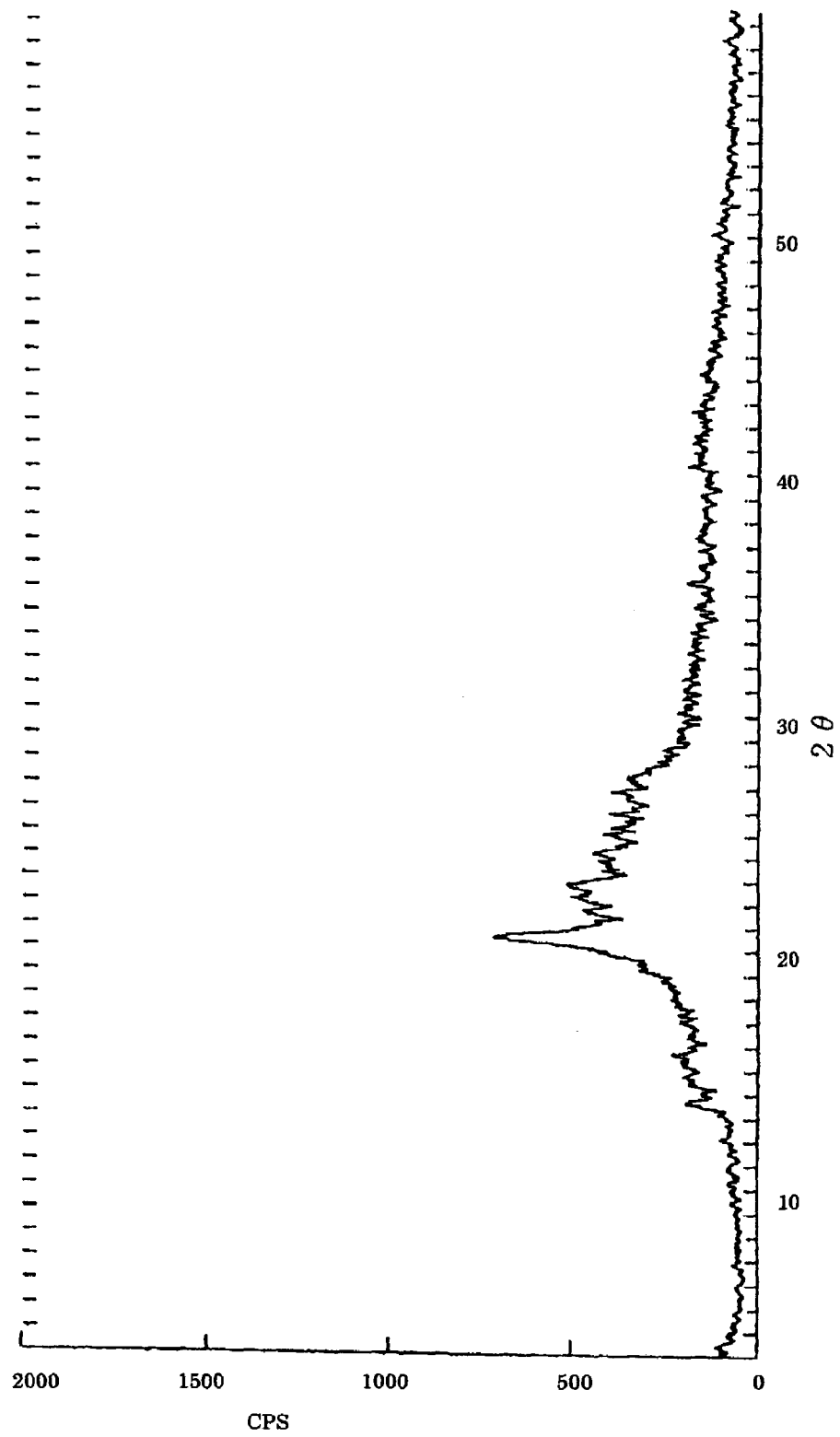
FIG. 11 shows an X-ray diffraction pattern (measured at 25° C.) of powder of the molecular compound consisting of TEP and PET 1,800 [composition ratio of TEP and EI unit: 1:6 (molar ratio)], obtained in Example 5 of the present invention.

Preparation of a molecular compound containing 1,1,2,2-tetrakis(4-hydroxyphenyl)ethane (TEP) mid a polyamine as constituent compounds 2.5 mmol (1.0 g) of TEP and 2.5 mmol (4.5 g) of polyethylene imine having an average molecular weight of 1,800 (PE) were added to 10 ml of water and heated to dissolve. The resulting solution was left to stand for 24 hours at room temperature. The deposited white solid was separated by filtration and dried under reduced pressure at 45° C. for 2 hours using a rotary vacuum pump, to give a molecular compound of a composition ratio of TEP and the ethylene imine (EI) unit of 1:6 (molar ratio). The obtained compound was confirmed to be the molecular compound of the said composition by $^1$H-NMR and X-ray diffraction patterns. It was also confirmed that the molecular compound had orientating EI chains that were three-dimensionally cross-linked with hydrogen bonds, from the signal of the methylene carbon of —CH$_2$—N—CH$_2$—, which was observed near 52 ppm on the $^{13}$C-CP/MAS solid state NMR spectra and photographs of scanning electron microscope (SEM). The molecular compound decomposed at 274° C. or above. An X-ray diffraction pattern of powder of the molecular compound is shown in FIG. 11. As described above, when the molecular compound of the present invention was formed, PEI, which is a liquid at an ordinary temperature, was aligned and organized to solidify so as to become highly resistant to heat, be made stronger and have a flexible structure.

EXAMPLE 6

Preparation of a molecular compound containing 1,1,2,2-tetrakis(3-methyl-4-hydroxyphenyl)ethane (TEOC) and a polyether as constituent compounds 2.5 mmol (1.1 g) of TEOC and 2.5 mmol (5.0 g) of PEG having an average molecular weight of 1.000 (PEG 1.000) were added to 10 ml of water and heated to suspend with stirring. The resulting suspension was left to stand for 24 hours, at room temperature. The deposited white solid was separated by filtration and dried under reduced pressure at 45° C. for 2 hours using a rotary vacuum pump, to give a molecular compound of a composition ratio of TEOC and the ethylene oxide (EO) unit of 1:6 (molar ratio). The obtained compound was confirmed to be the molecular compound of the said composition by thermal analysis (TG/DTA), $^1$H-NMR and X-ray diffraction patterns. It was also confirmed that each molecular compound had direction-specific intermolecular hydrogen bonds and orientating EO chains with rapid exchange between the gauche and trans conformations, from the wagging vibration absorption band of C—H of OCH$_2$)$_2$—O, which was observed near 1360 cm$^{-1}$ on the infrared absorption spectra (IR), and the signal of the methylene carbon of —CH$_2$—O—CH$_2$—, which was observed near 70 ppm on the $^{13}$C-CP/MAS solid state NMR spectra.

Figure 12:
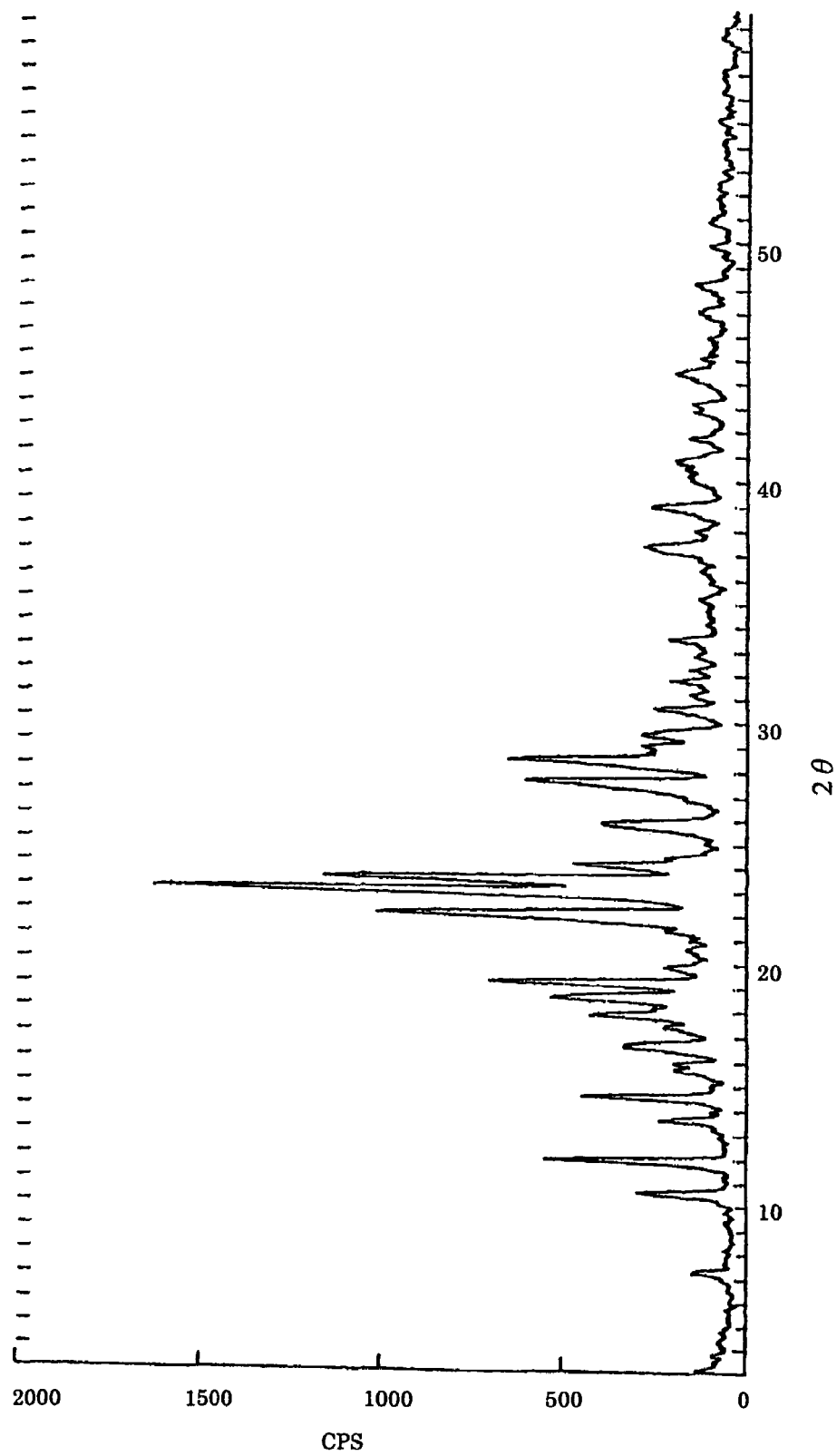
FIG. 12 shows an X-ray diffraction pattern (measured at 25° C.) of powder of the molecular compound consisting of TEOC and PEG 1,000 [composition ratio of TEP and EO unit: 1:6 (molar ratio)], obtained in Example 6 of the present invention.
Figure 13:
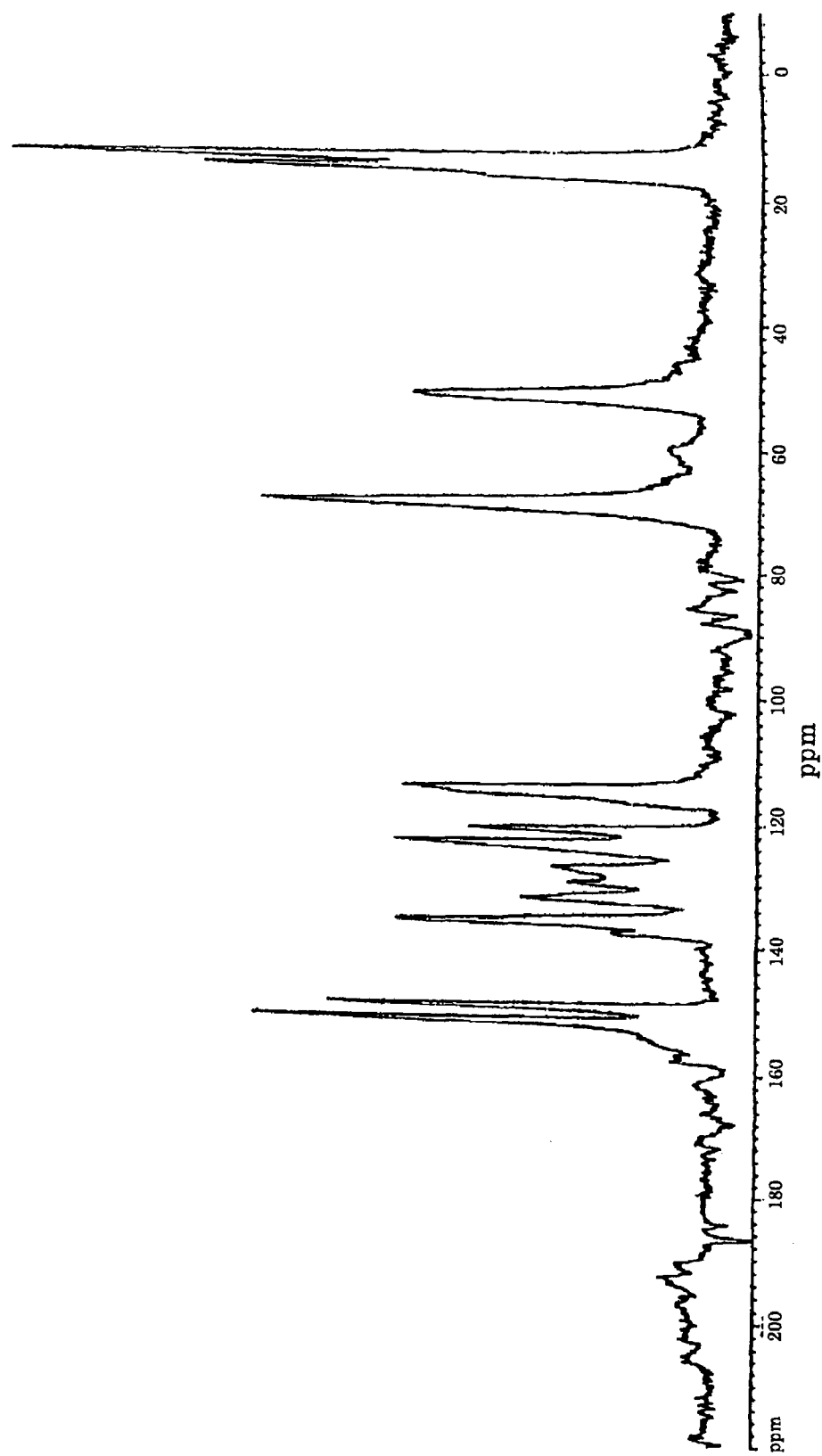
FIG. 13 shows a $^{13}$C-CP/MAS solid state NMR spectrum (measured at 27° C. at the rotational frequency of rotor of 3.5 kHz) of the molecular compound consisting of TEOC and PEG 1,000 [composition ratio of TEP and EO unit: 1:6 (molar ratio)], obtained in Example 6 of the present invention.
Figure 14:
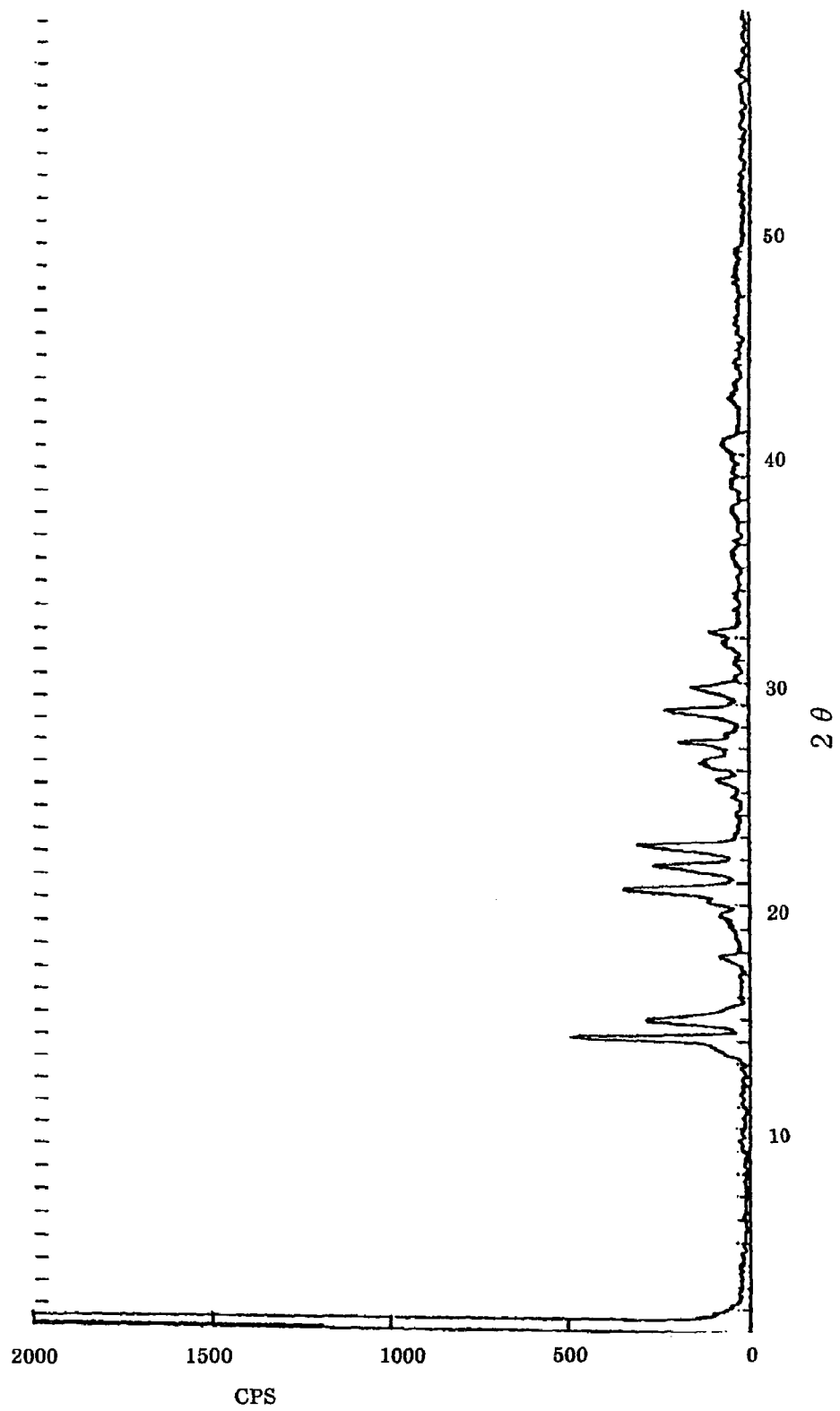
FIG. 14 shows an X-ray diffraction pattern (measured at 25° C.) of powder of TEOC used in Example 6 of the present invention.
Figure 15:
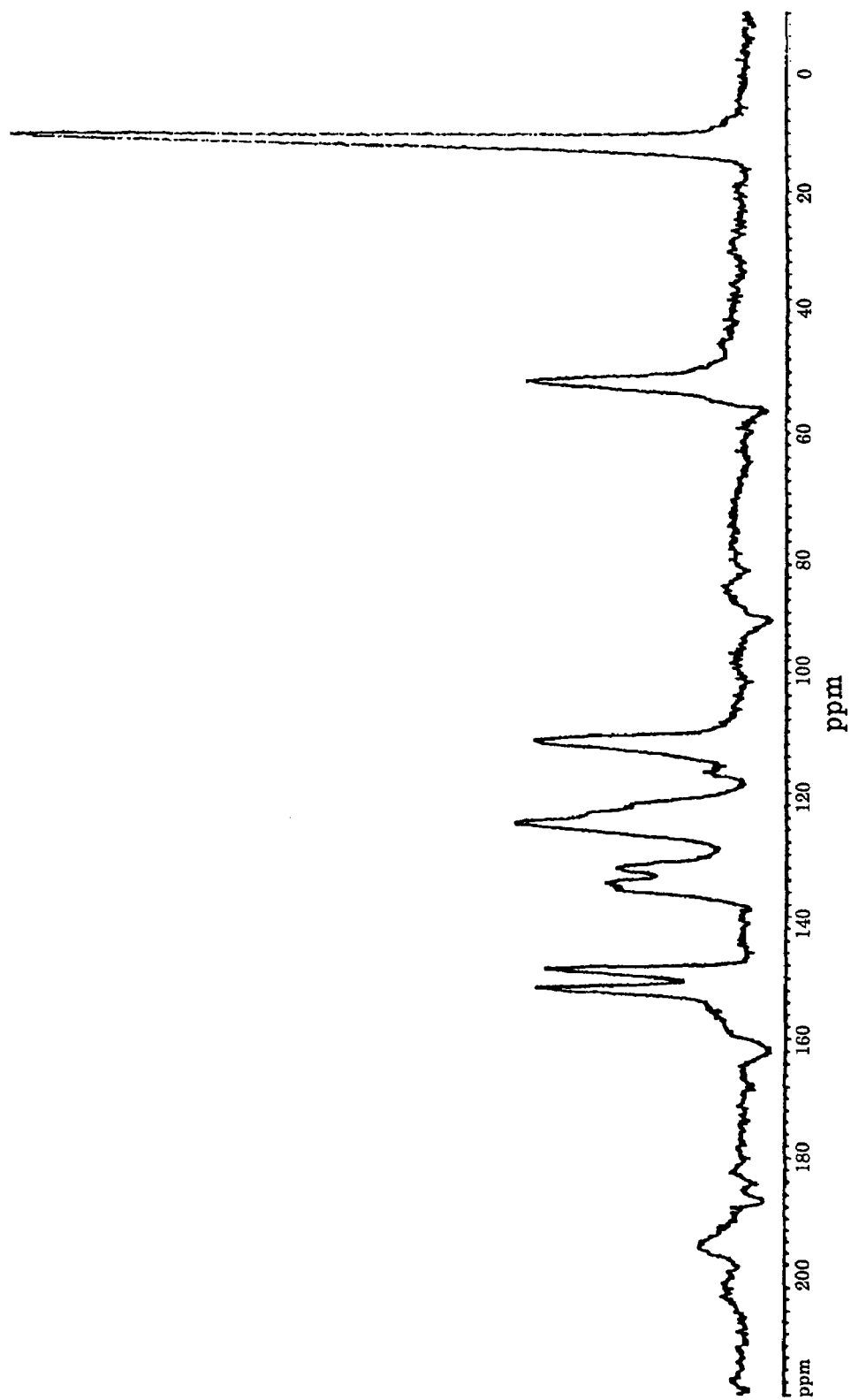
FIG. 15 shows a $^{13}$C-CP/MAS solid state NMR spectrum (measured at 27° C. at the rotational frequency of rotor of 3.5 kHz) of TEOC used in Example 6 of the present invention.

The molecular compound melted in the range of 237° C. and 258° C. An X-ray diffraction pattern of powder of the molecular compound is shown in FIG. 12. In addition a $^{13}$C-CP/MAS solid state NMR spectrum is shown in FIG. 13. For comparison, an X-ray diffraction pattern of powder of TEOC is shown in FIG. 14, and a $^{13}$C-CP/MAS solid state NMR spectrum in FIG. 15. As described above, when the molecular compound of the present invention was formed, PEG with a low melting point was aligned and organized so as to become highly resistant to heat, be made stronger and have a flexible structure.

EXAMPLE 7

Preparation of a molecular compound containing 1,1,2,2-tetrakis(4-carboxyphenyl)ethane (TEPCOOH) and a polyvinyl heterocyclic compound as constituent compounds 3.5 ml of all ethanol solution of TEPCOOH of a concentration of $2.9 \times 10^{-4}$M was gradually added to 4.5 ml of an ethanol solution of poly(4-vinylpyridine) having all average molecular weight of 60,000 (PVP) of a concentration of $4.2 \times 10^{-4}$M, and left to stand for 2.5 hours at room temperature. The deposited white solid was separated by filtration and dried under reduced pressure at 40° C. for 2 hours using a rotary vacuum pump, to give a molecular compound consisting of TEPCOOH and PVP at a composition ratio of 1:0.015 (molar ratio). The obtained compound was confirmed to be the molecular compound of the said composition by $^1$H-NMR and X-ray diffraction patterns. It was also confirmed that the molecular compound had orientating ethylene chains with intermolecular hydrogen bonds between the carboxyl group of TEPCOOH and the pyridyl group of PVP, from the stretching band of —OH of the carboxyl group, which was observed near 3420 cm$^{-1}$ on the infrared absorption spectra (IR), and the signal of the methylene carbon of —CH$_2$—CH$_2$—, which was observed near 40 ppm on the $^{13}$C-CP/MAS solid state NMR spectra.

Figure 16:
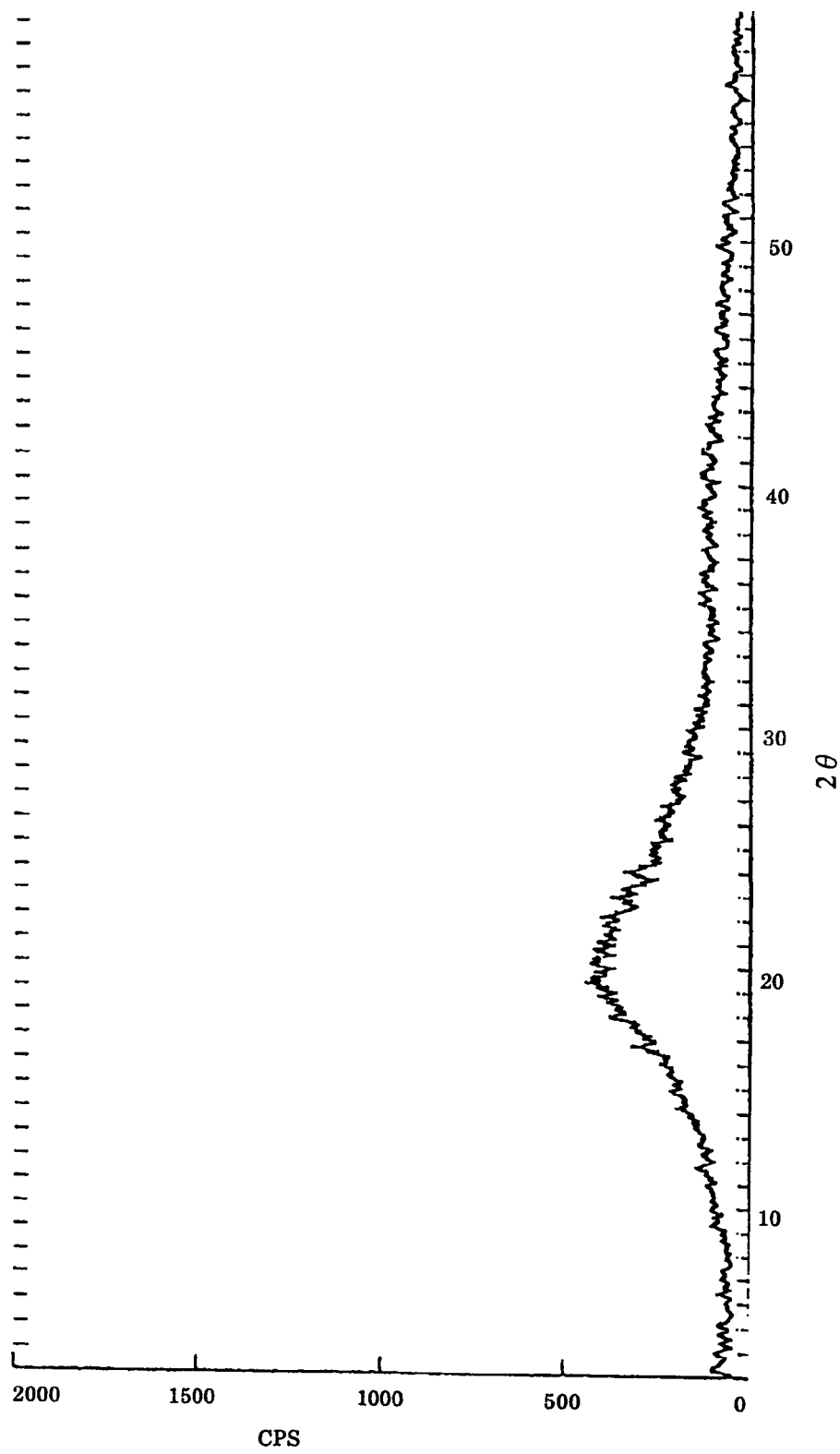
FIG. 16 shows an X-ray diffraction pattern (measured at 25° C.) of powder of the molecular compound consisting of TEPCOOH and PVP 60,000 at a composition ratio of 1:0.015 (molar ratio), obtained in Example 7 of the present invention.
Figure 17:
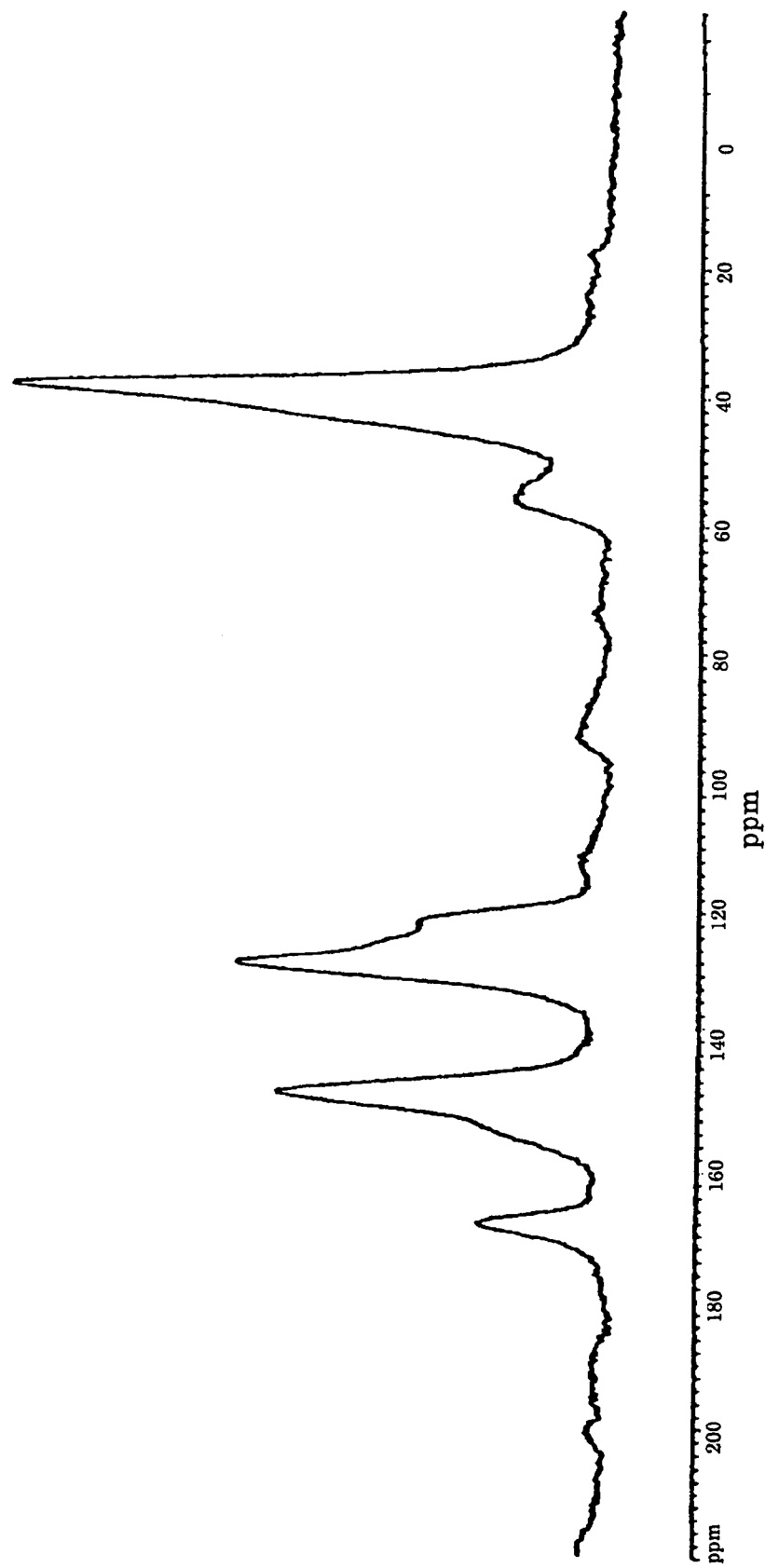
FIG. 17 shows a $^{13}$C-CP/MAS solid state NMR spectrum (measured at 27° C. at the rotational frequency of rotor of 3.5 kHz) of the molecular compound consisting of TEPCOOH and PVP 60,000 at a composition ratio of 1:0.015 (molar ratio), obtained in Example 7 of the present invention.
Figure 18:
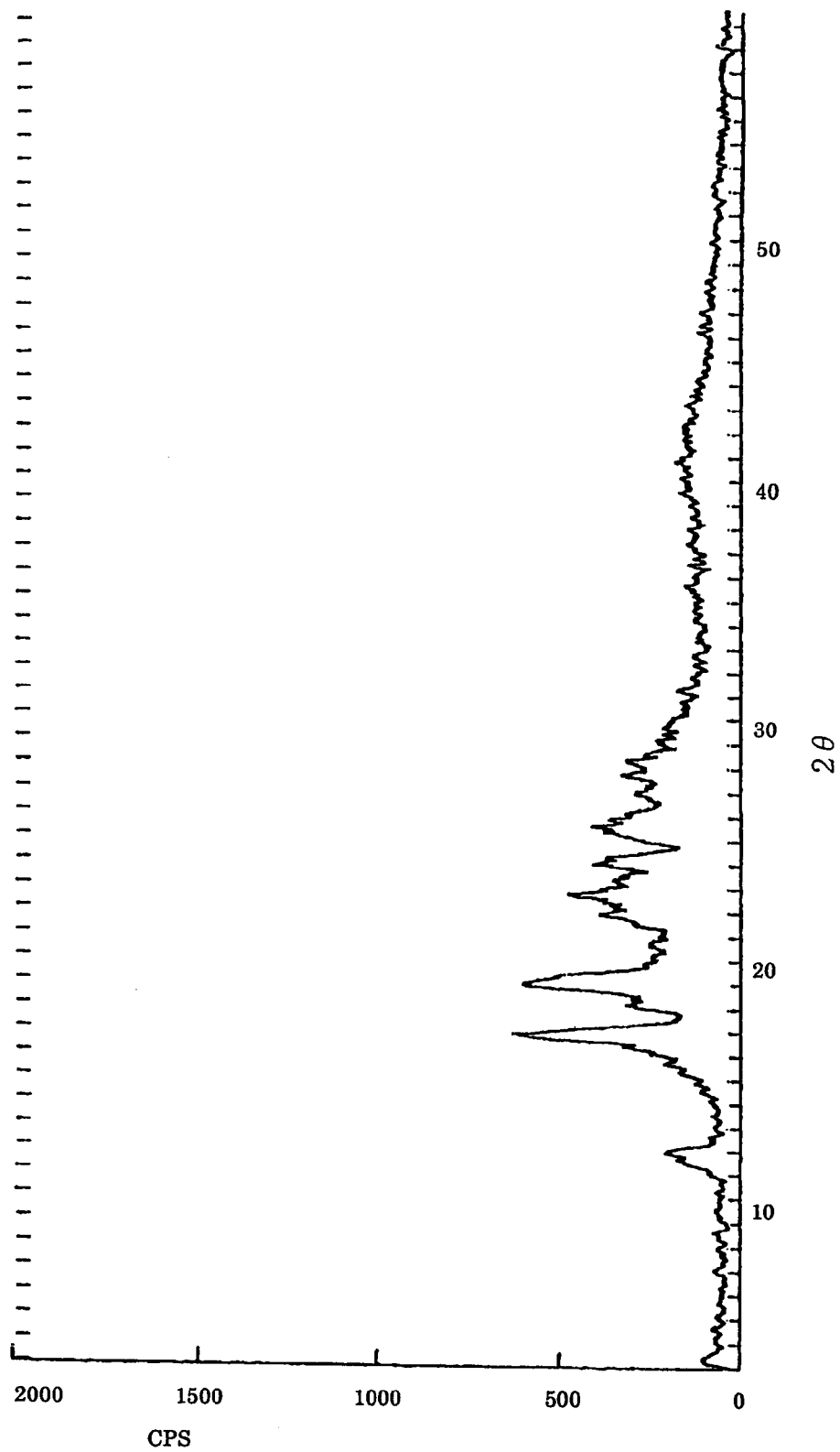
FIG. 18 shows an X-ray diffraction pattern (measured at 25° C.) of powder of TEPCOOH used in Example 7 of the present invention.
Figure 19:
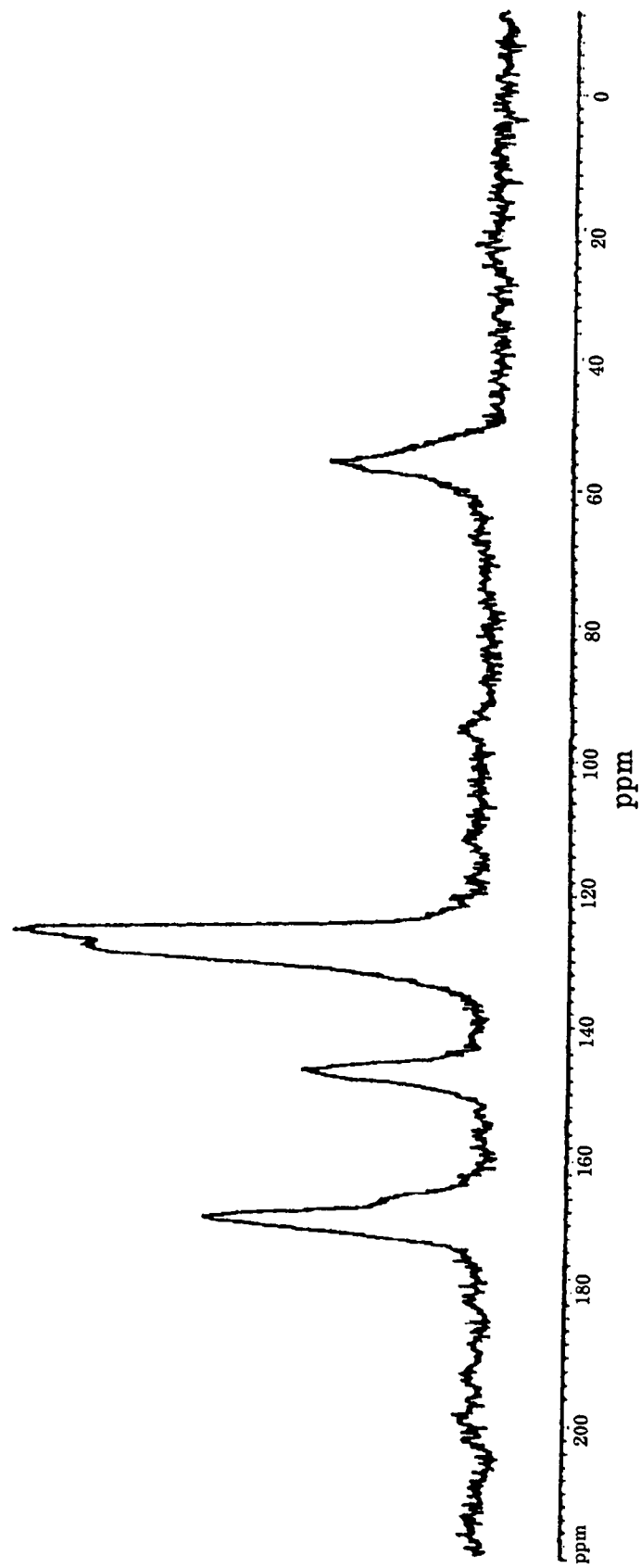
FIG. 19 shows a $^{13}$CP/MAS solid state NMR spectrum (measured at 27° C. at the rotational frequency of rotor of 3.5 kHz) of TEPCOOH used in Example 7 of the present invention.

The molecular compound melted in the range of 276° C. and 312° C. An X-ray diffraction pattern of powder of the molecular compound is shown in FIG. 16. In addition, a $^{13}$C-CP/MAS solid state NMR spectrum is shown in FIG. 17. For comparison, an X-ray diffraction pattern of powder of TEPCOOH is shown in FIG. 18, and a $^{13}$C-CP/MAS solid state NMR spectrum in FIG. 19. As described above, when the molecular compound of the present invention was formed, it became possible to align and control PVP, to make it highly resistant to heat and stronger, and to give it a flexible structure.

EXAMPLE 8

Preparation of a molecular compound containing 1,1,2,2-tetrakis(4-hydroxyphenyl)ethane (TEP), a polyether and a pesticide as constituent compounds 2.5 mmol (1.0 g) of TEP. 5.0 mmol (5.0 g) of PEG having an average molecular weight of 1.000 (PEG 1.000) and 5.0 mmol (5.0 g) of Allethrin were added to 10 ml of water and heated to dissolve. The resulting solution was left to stand for 3 hours at room temperature. The deposited light yellow solid was separated by filtration and dried under reduced pressure at 45° C. for 2 hours using a rotary vacuum pump, to give a molecular compound consisting of TEP, PEG and Allethrin at a composition ratio of 1:0.5: 1 (molar ratio). The obtained compound was confirmed to be tile molecular compound of the said composition by thermal analysis (TG/DTA), $^1$H-NMR and X-ray diffraction pattern. It was also confirmed that the molecular compound had orientating EO chains with direction-specific intermolecular hydrogen bonds, from the stretching band of O(CH$_2$)$_2$—O, which was observed near 1360 cm$^{-1}$ on the infrared absorption spectra (IR), and the signal of the methylene carbon of —CH$_2$—O—CH—, which was observed near 70 ppm on the $^{13}$C-CP/MAS solid state NMR spectra.

Figure 20:
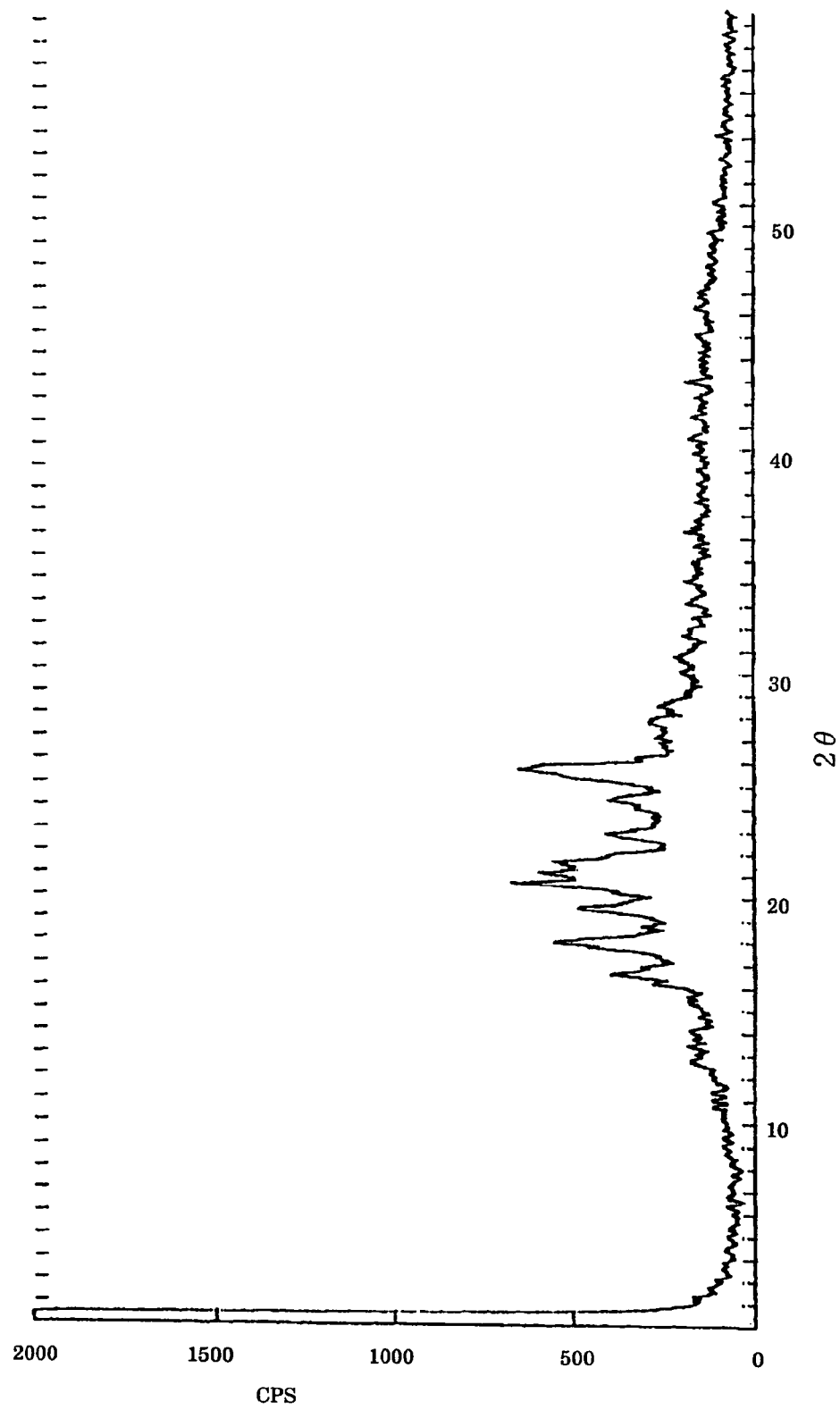
FIG. 20 shows an X-ray diffraction pattern (measured at 25° C.) of powder of the molecular compound consisting of TEP. PEG 1,000 amid Allethrin at a composition ratio of 1:0.5:1 (molar ratio), obtained in Example 8 of the present invention.
Figure 21:
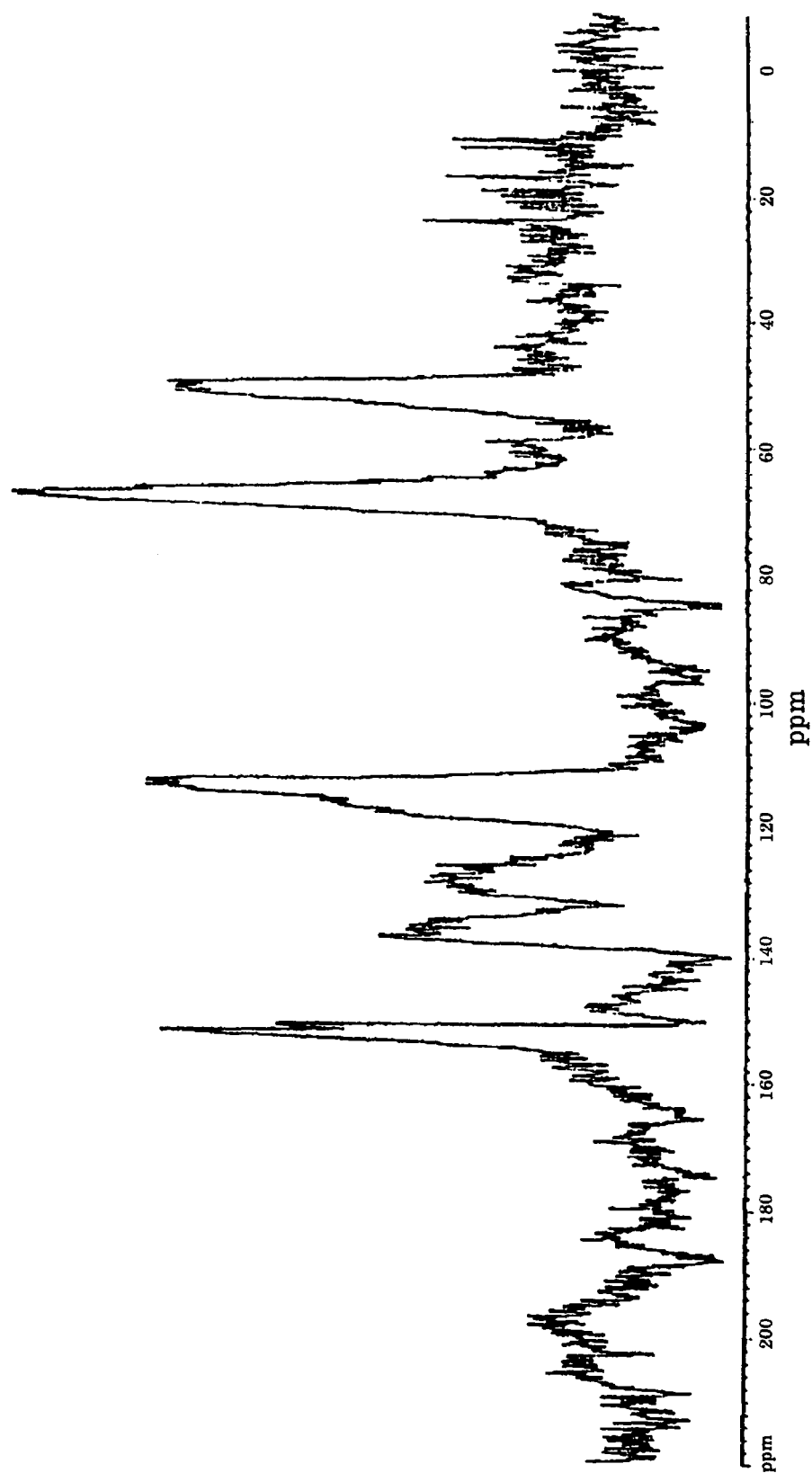
FIG. 21 shows a $^{13}$C-CP/MAS solid state NMR spectrum (measured at 27° C. at the rotational frequency of rotor of 3.5 kHz) of the molecular compound consisting of TEP. PEG 1,000 and Allethrin at a composition ratio of 1:0.5:1 (molar ratio), obtained in Example 8 of the present invention.

The molecular compound melted and released Allethrin in the range of 140° C. and 151° C. An X-ray diffraction pattern of powder of the molecular compound is shown in FIG. 20. In addition, a $^{13}$C-CP/MAS solid state NMR spectrum is shown in FIG. 21. As described above, when the molecular compound of the present invention was formed, PEG was aligned and organized so that Allethrin, which is a liquid at room temperature, was pulverized and controlled in vaporization.

EXAMPLE 9

Preparation of a molecular compound containing 1,1,2,2-tetrakis(4-hydroxyphenyl)ethane (TEP), a polyether and a bactericide as constituent compounds 5.0 mmol (5.0 g) of PEG having an average molecular weight of 1,000 (PEG 1,000) and 12.5 mmol (4.30 g) of benzalkonium chloride (M$_2$-100) were heated to melt and mix. 12.5 mmol (5.0 g) of TEP was added. The resulting mixture was left to stand for 24 hours at room temperature. The solid was dried under reduced pressure at 45° C. for 2 hours using a rotary vacuum pump, to give a molecular compound consisting of TEP. PEG and M$_2$-100 at a composition ratio of 1:0.4:1 (molar ratio). The obtained compound was confirmed to be the molecular compound of the said composition by thermal analysis (TG/DTA), $^1$H-NMR and X-ray diffraction patterns. It was also confirmed that the molecular compound had orientating EO chains with direction-specific intermolecular hydrogen bonds, from the wagging vibration absorption band of C—H of O—(CH$_2$)$_2$—O, which was observed near 1360 cm$^{-1}$ on the infrared absorption spectra (IR), and the signal of the methylene carbon of —CH$_2$—O—CH$_2$—, which was observed near 70 ppm on the $^{13}$C-CP/MAS solid state NMR spectra.

Figure 22:
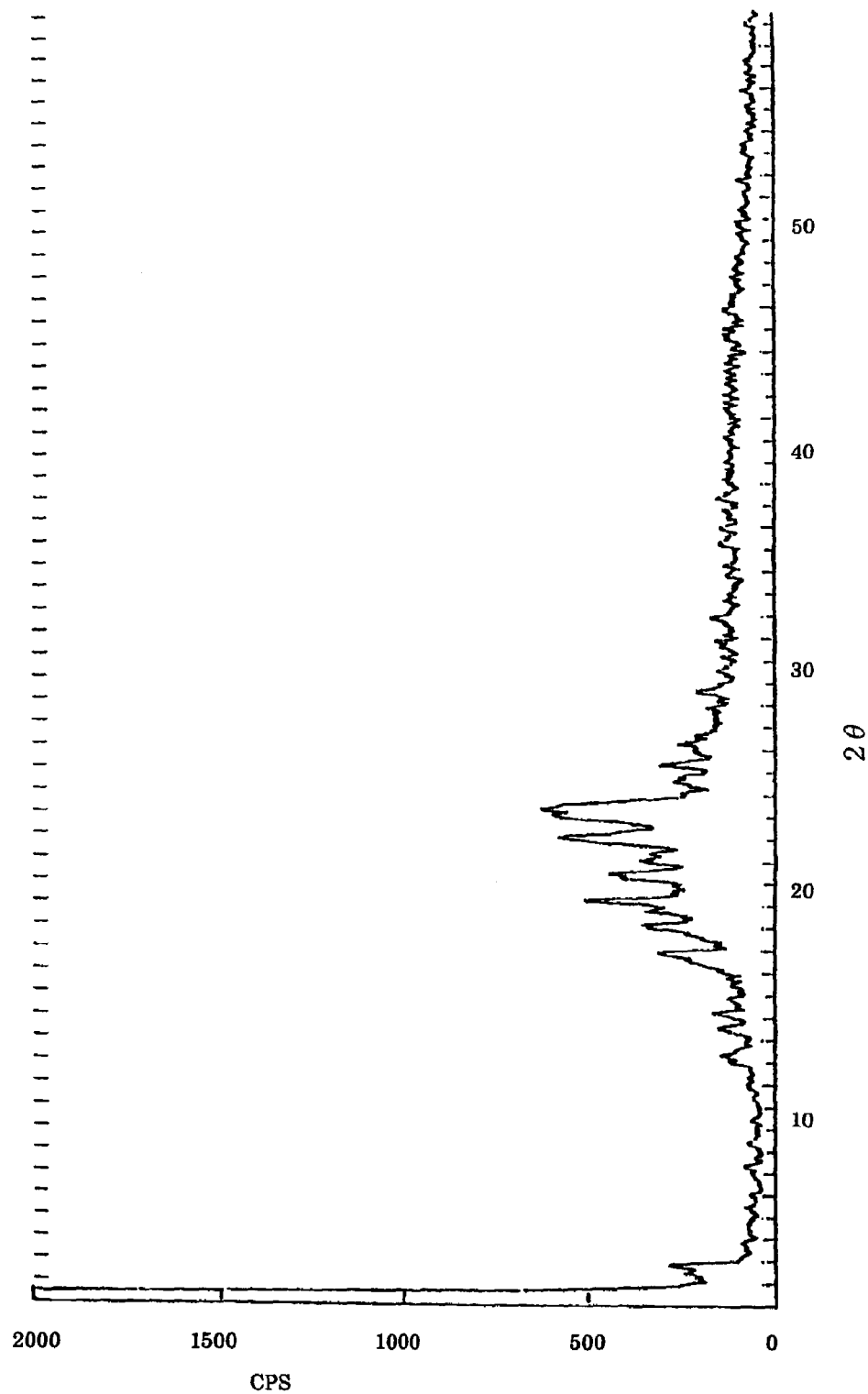
FIG. 22 shows an X-ray diffraction pattern (measured at 25° C.) of powder of the molecular compound consisting of TEP, PEG 1,000 and benzalkonium chloride at a composition ratio of 1:0.4:1 (mole ratio), obtained in Example 9 of the present invention.
Figure 23:
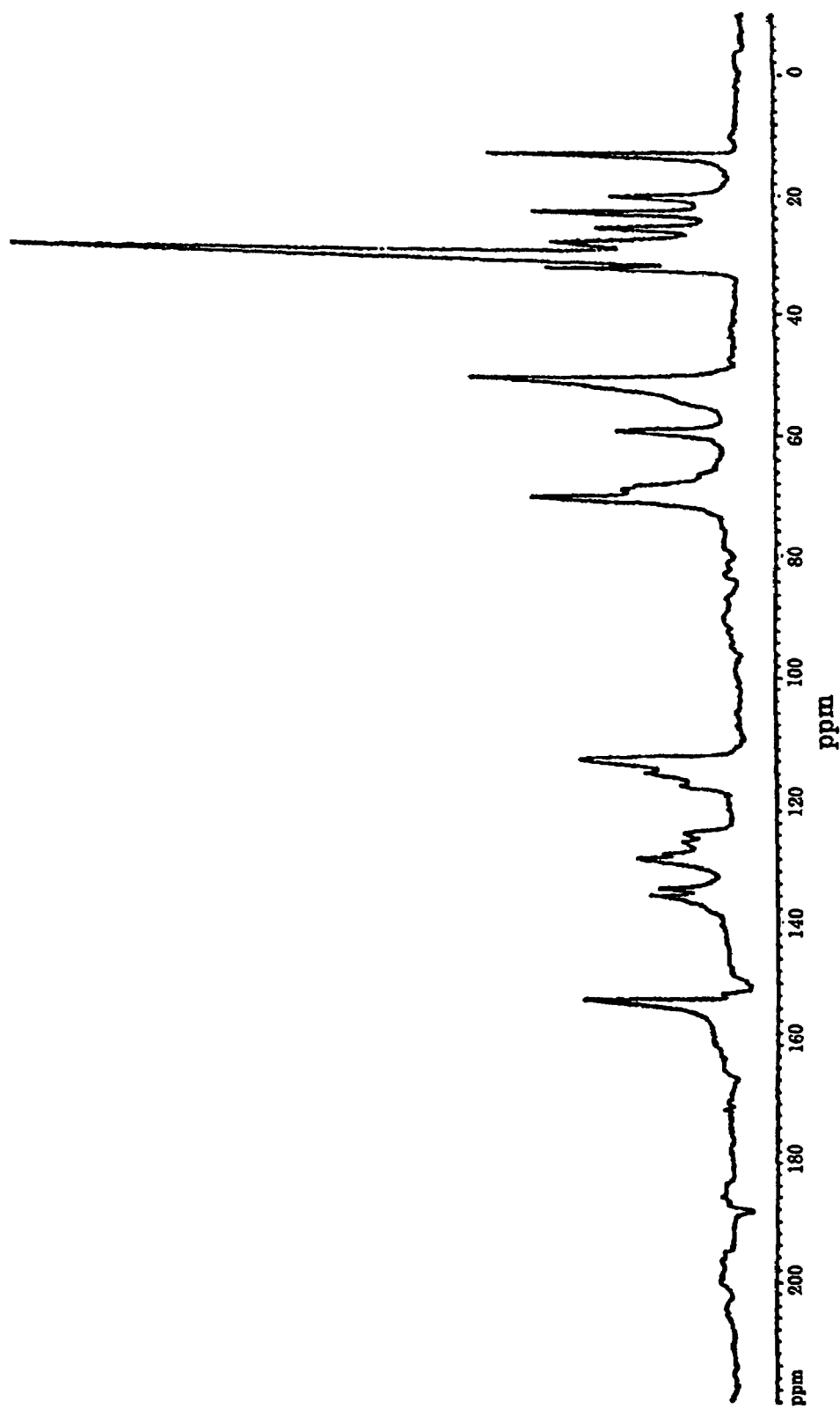
FIG. 23 shows a $^{13}$C-CP/MAS solid state NMR spectrum (measured at 27° C. at the rotational frequency of rotor of 3.5 kHz) of the molecular compound consisting of TEP, PEG 1,000 and benzalkonium chloride at a composition ratio of 1:0.4:1 (molar ratio), obtained in Example 9 of the present invention.

The molecular compound melted in the range of 222° C. and 254° C. An X-ray diffraction pattern of powder of the molecular compound is shown in FIG. 22. In addition, a $^{13}$C-CP/MAS solid state NMR spectrum is shown in FIG. 23. As described above, when the molecular compound of the present invention was formed, PEG was aligned and organized so that M$_2$-100, which has a low melting point and is irritating, was pulverized and made highly resistant to heat.

EXAMPLE 10

Preparation of a molecular compound containing 1,1,2,2-tetrakis(4-hydroxyphenyl)ethane (TEP), a polyether and a metal salt as constituent compounds 0.80 mmol (0.086 g) of lithium perchlorate was dissolved in 35 ml of an ethanol solution containing 40% by weight of acetonitrile. 0.001 mmol (0.5 g) of PEG having an average molecular weight of 500,000 (PEG 500,000) was heated to dissolve into the resulting solution. To the obtained solution was added 1.6 mmol (0.625 g) of TEP and heated to dissolve with stirring. The solution was flowed into a Teflon Petri dish and heated at 90° C. for 30 minutes under an argon gas stream to remove the solvent. When almost all of the solvent was removed, the residue was further dried under reduced pressure at 80° C. for 2 hours using a rotary vacuum pump, to give a semitransparent cast film of a composition ratio of TEP, the EO unit and lithium perchlorate of 1:7:14 (molar ratio). The obtained cast film was confirmed to be the molecular compound of the said composition by $^1$H-NMR and X-ray diffraction patterns. It was also confirmed that the cast film had orientating EO chains with direction-specific intermolecular hydrogen bonds, from the wagging vibration absorption band of C—H of O—(CH$_2$)$_2$—O, which was observed near 1360 cm$^{-1}$ on the infrared absorption spectra (IR), and the signal of the methylene carbon of —CH$_2$—O—CH$_2$—, which was observed near 70 ppm on the $^{13}$C-CP/MAS solid state NMR spectra.

Figure 24:
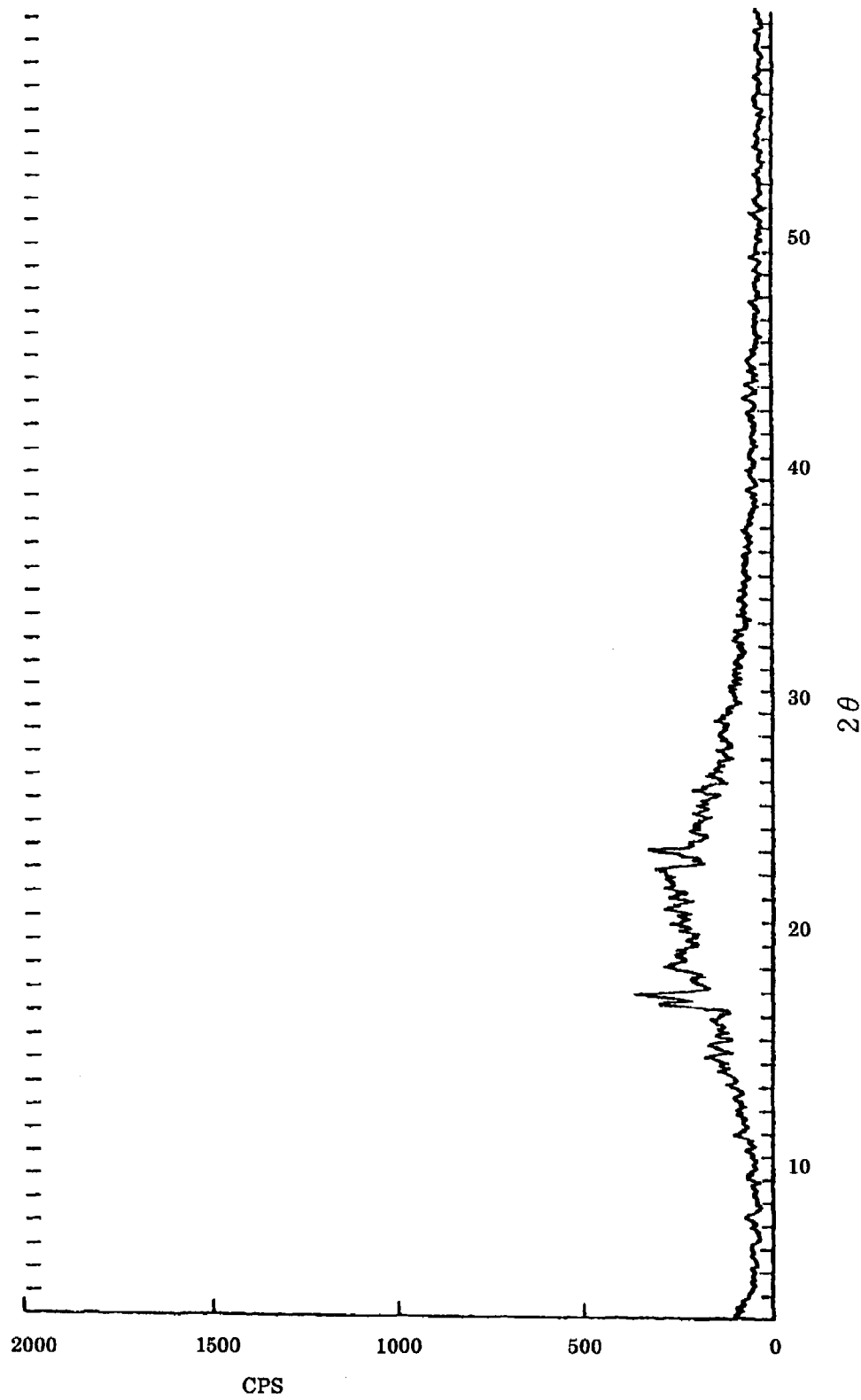
FIG. 24 shows an X-ray diffraction pattern (measured at 25° C.) of powder of the molecular compound consisting of TEP, PEG 500.000 and lithium perchlorate [composition ratio of TEP, EO unit and lithium perchlorate: 1:7:14 (molar ratio)], obtained in Example 10 of the present invention.

The molecular compound melted in the range of 140° C. and 180° C. An X-ray diffraction pattern of powder of the molecular compound is shown in FIG. 24. As described above, when the molecular compound of tile present invention was formed, PEG was aligned and organized so that lithium perchlorate, which is very hygroscopic, was made formed became highly resistant to eat and had a flexible structure.

APPLICABILITY IN INDUSTRY

The molecular compounds of the present invention are tie multi-molecular assemblies that self-associating compounds having diffusive hydrogen bond sites are associated with hydrogen bonding polymers via hydrogen bonds, and can be produced by simple operations. Besides, interaction points and forces in molecular assemblies are fixed as well as controlled to give functions, such as alignment and modification of constituent polymers. According to the present invention, it is possible to make various substances chemically stable, nonvolatile, slow-released, pulverized, ionized and included. Their expected applications are in the fields of functional materials having nano-organized structures, slow-release functional formulations, control of catalyst activities, selective separations and recoveries. The molecular compounds of the present invention can be used together with a variety of substances, whether inorganic or organic, and can be preferably used in any foam including crystal, liquid crystal, gel, precipitated solid, coacervate, emulsion aid liquid. Furthermore, the molecular compounds of the present invention can be applied widely to various materials provided as composite materials for industrial or biomedical uses, such as base materials for formulations, recycling base materials, waste water treating agents, energy transducers, conductors, reaction catalysts, artificial enzymes and artificial cells. Therefore, the present invention is applicable to a wide range of fields including information-recording, materials, electric and electronic magnetic materials, optical functional materials, membranes, environment-adaptable materials and biomedical materials. This is an invention of great significance in industry.

What is claimed is:

1. A molecular compound: comprising a self-associating compound with 4 or more diffusive hydrogen bond sites; and a polymer having one or more hydrogen bond sites, in which the self-associating compound with 4 or more diffusive hydrogen bond sites is a tetrakis aryl compound represented by Formula (1):

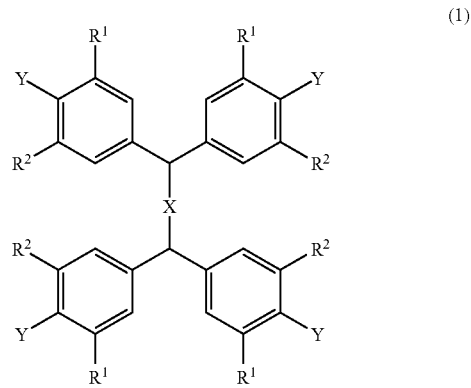

wherein, X is (CH$_2$)$_n$; n is 0, 1, or 2; Y is hydroxyl, carboxyl or optionally substituted amino; R$^1$ and R$^2$ are each hydrogen, lower alkyl, optionally substituted phenyl, halogen or lower alkoxy;

the polymer having one or more hydrogen bond sites is one or more polymers selected from the group consisting of polyethers, and polyamines, the polymer having one or more hydrogen bond sites has an average molecular weight with 1,000 to 2,000,000, and said molecular compound is a solid molecular compound having a melting point in the range of 140° C. and 297° C.

2. The molecular compound of claim 1, wherein the lower alkyl described for R$^1$ and R$^2$ is an alkyl group having no more than four carbon atoms, and the lower alkoxy described for R$^1$ and R$^2$ is a methoxy group.

3. The molecular compound of claim 1, wherein the polymer having one or more hydrogen bond sites has an average molecular weight within 2,000 to 2,000,000.

* * * * *

UNITED STATES PATENT AND TRADEMARK OFFICE
CERTIFICATE OF CORRECTION

| | | |
|---|---|---|
| PATENT NO. | : 7,601,784 B2 | Page 1 of 1 |
| APPLICATION NO. | : 11/125283 | |
| DATED | : October 13, 2009 | |
| INVENTOR(S) | : Suzuki et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 375 days.

Signed and Sealed this

Fifth Day of October, 2010

David J. Kappos
*Director of the United States Patent and Trademark Office*